(12) United States Patent  (10) Patent No.: US 7,940,780 B2
Yamamoto et al.  (45) Date of Patent: May 10, 2011

(54) DATA COMMUNICATION SYSTEM ENABLING DATA COMMUNICATION BETWEEN COMMUNICATION DEVICES THROUGH A SERVER

(75) Inventors: Dan Yamamoto, Yokohama (JP); Tadashi Kaji, Yokohama (JP); Akifumi Yato, Kawasaki (JP); Takahiro Fujishiro, Yokohama (JP); Shinichi Irube, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/205,154

(22) Filed: Sep. 5, 2008

(65) Prior Publication Data
US 2009/0067439 A1  Mar. 12, 2009

(30) Foreign Application Priority Data
Sep. 10, 2007  (JP) .................... 2007-233538

(51) Int. Cl.
*H04L 12/56* (2006.01)
(52) U.S. Cl. ....................... 370/400; 455/405
(58) Field of Classification Search .................. 370/389, 370/400; 709/204–206
See application file for complete search history.

(56) References Cited

U.S. PATENT DOCUMENTS
7,298,733 B2* 11/2007 Sakai et al. ............... 370/352
2004/0133683 A1* 7/2004 Keller et al. ............... 709/227
2005/0220039 A1* 10/2005 Hoshino et al. ............ 370/261
2008/0098225 A1* 4/2008 Baysinger .................. 713/171
2008/0161114 A1* 7/2008 Wang et al. ................ 463/42

FOREIGN PATENT DOCUMENTS
JP  2005-284753  10/2005

OTHER PUBLICATIONS

Rosenberg et al "Session Initiation Protocol", RFC 3261, p. 1-270, Jun. 2002, The Internet Society.
"Technical Specification," 3GPP TS23/228, V8.0.0, 3rd Generation Partnership Project; Technical Specification Group Service and System Aspects; IP Multimedia Subsystem (IMS) Stage 2 pp. 2-224 vol. 8 Mar. 2007.

* cited by examiner

*Primary Examiner* — Ayaz R Sheikh
*Assistant Examiner* — Mounir Moutaouakil
(74) *Attorney, Agent, or Firm* — McDermott Will & Emery LLP

(57) ABSTRACT

A method and a system for speeding up session establishment are provided, wherein the time required to establish a session is reduced, even in the case where a session management server requires a large amount of time to process respective functions required for establishing the session (such as making a decision regarding whether to permit or deny provision of a service, or generating a session key).

The session management server is provided with means for conducting, in parallel, processing to issue processing requests for respective functions required for establishing a session (such as making a decision regarding whether to permit or deny provision of a service, or generating a session key) and processing to forward a communication message transmitted by a communications device or another session management server attempting to establish a session.

7 Claims, 23 Drawing Sheets

FIG. 5
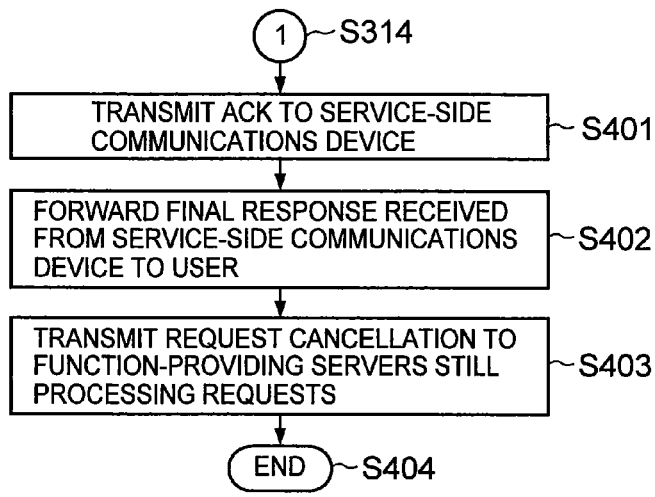
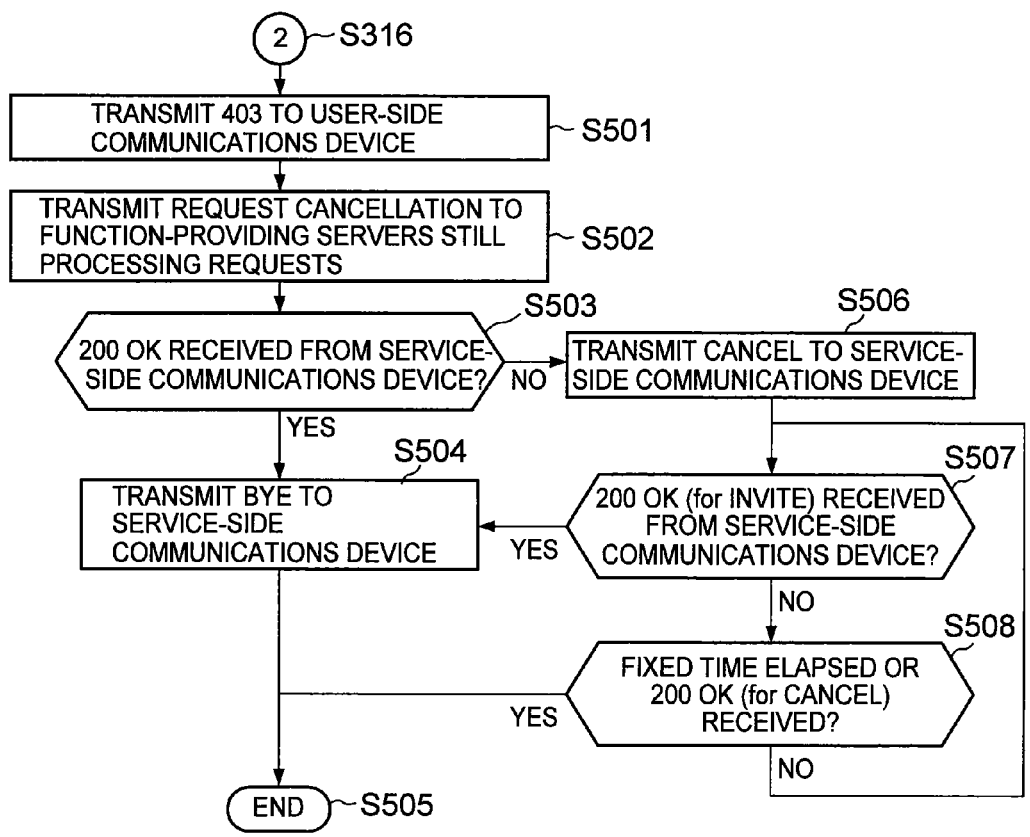

FIG. 7

SESSION LOG DB 70

| FROM | TO | CALL ID | KEY INFORMATION | SESSION LOG INFORMATION |
|---|---|---|---|---|
| sip:cl1@ hitachi .com | sip:sv1@ hitachi .com | 1e51as35 d4fa63s@ hitachi .com | <Key type="AES256"> <OctetString> FD634B8CA··· </OctetString></Key> | 2007-01-03T 15:20:34+09:00: START 2007-01-03T 17:02:10+09:00: END |
| sip:cl2@ hitachi .com | sip:sv1@ hitachi .com | 87gjh3887 dfhdkf9@ hitachi .com | - | 2007-01-03T 18:25:11+09:00: ESTABLISHING SESSION (WAITING FOR RESPONSE FROM DESTINATION) |

RIGHTS DB 80

| FROM | TO | TIME |
|---|---|---|
| sip:cl1@hitachi.com | sip:sv1@hitachi.com | EVERY DAY 09:00-17:00 |
| sip:cl2@hitachi.com | sip:sv1@hitachi.com | EVERY DAY 00:00-23:59 |

APPLICATION LOG DB 50

| FROM | TO | CALL ID | AP LOG INFORMATION |
|---|---|---|---|
| sip:cl1@hitachi. com | sip:sv1@hitachi. com | 1e51as35d4fa63s @hitachi.com | CONTENT a USAGE: ¥500 |
| sip:cl2@hitachi. com | sip:sv1@hitachi. com | 87gjh3887dfhdkf9 @hitachi.com | CONTENT b USAGE: ¥300 |

FIG. 8

RIGHTS DECISION REQUEST
MESSAGE BODY PORTION M103-1

```
<Permission status="request" id ="358a1a77">
  <From> sip:cl1@hitachi.com </From>
  <To> sip:sv1@hitachi.com</To>
  <Date> 2007-01-03T15:20:33+09:00 </Date>
</Permission>
```

DECISION RESULT [PERMIT]
MESSAGE BODY PORTION M112-1

```
<Permission status="accept" id ="358a1a77">
  <From> sip:cl1@hitachi.com </From>
  <To> sip:sv1@hitachi.com</To>
  <Date> 2007-01-03T15:20:34+09:00 </Date>
</Permission>
```

DECISION RESULT [DENY]
MESSAGE BODY PORTION M121-1

```
<Permission status="reject" id ="358a1a77">
  <From> sip:cl1@hitachi.com </From>
  <To> sip:sv1@hitachi.com</To>
  <Date> 2007-01-03T15:20:33+09:00 </Date>
</Permission>
```

CANCEL RIGHTS DECISION
MESSAGE BODY PORTION M145-1

```
<Permission status="cancel" id ="358a1a77">
  <From> sip:cl1@hitachi.com </From>
  <To> sip:sv1@hitachi.com</To>
  <Date> 2007-01-03T15:20:34+09:00 </Date>
</Permission>
```

CANCEL RIGHTS DECISION RESPONSE
MESSAGE BODY PORTION M146-1

```
<Permission status="canceled" id ="358a1a77">
  <From> sip:cl1@hitachi.com </From>
  <To> sip:sv1@hitachi.com</To>
  <Date> 2007-01-03T15:20:34+09:00 </Date>
</Permission>
```

BYE MESSAGE BODY PORTION M126-1

```
<SessionInfo status="cancel">
  <From> sip:cl1@hitachi.com </From>
  <To> sip:sv1@hitachi.com</To>
  <Date> 2007-01-03T15:20:34+09:00 </Date>
</SessionInfo>
```

KEY GENERATION REQUEST MESSAGE
BODY PORTION M104-1

```
<KeyGen status="request">
  <From> sip:cl1@hitachi.com </From>
  <To> sip:sv1@hitachi.com</To>
  <CallID> 1e51as35d4fa63s
          @hitachi.com </CallID>
  <Date> 2007-01-03T15:20:33+09:00 </Date>
  <Key scheme="AES256"><Key>
</KeyGen>
```

KEY GENERATION RESULT MESSAGE
BODY PORTION M113-1

```
<KeyGen status="response">
  <From> sip:cl1@hitachi.com </From>
  <To> sip:sv1@hitachi.com</To>
  <CallID> 1e51as35d4fa63s
          @hitachi.com </CallID>
  <Date> 2007-01-03T15:20:34+09:00 </Date>
  <Key scheme="AES256">
   <OctetString>
    FD634B8CA00D050341102763030F9F70
    D1E939BD47B6622DC39CC76265126FE9
   </OctetString>
  </Key>
</KeyGen>
```

CANCEL KEY GENERATION MESSAGE
BODY PORTION M124-1

```
<KeyGen status="cancel">
  <From> sip:cl1@hitachi.com </From>
  <To> sip:sv1@hitachi.com</To>
  <CallID> 1e51as35d4fa63s
          @hitachi.com </CallID>
  <Date> 2007-01-03T15:20:34+09:00 </Date>
</KeyGen>
```

CANCEL KEY GENERATION RESPONSE
MESSAGE BODY PORTION M125-1

```
<KeyGen status="canceled">
  <From> sip:cl1@hitachi.com </From>
  <To> sip:sv1@hitachi.com</To>
  <CallID> 1e51as35d4fa63s
          @hitachi.com </CallID>
  <Date> 2007-01-03T15:20:34+09:00 </Date>
</KeyGen>
```

FIG. 9

SESSION LOG INFORMATION
MESSAGE BODY PORTION M306-1

```
<SessionInfo status="sessionLog" id ="469b2b88">
 <From> sip:cl1@hitachi.com </From>
 <To> sip:sv1@hitachi.com</To>
 <CallID> 1e51as35d4fa63s@hitachi.com</CallID>
 <Log>
   <Date> 2007-01-03T15:20:34+09:00 </Date>
   <Message>session opened</Message>
 </Log>
 <Log>
   <Date> 2007-01-03T17:02:10+09:00 </Date>
   <Message>session closed</Message>
 </Log>
</SessionInfo>
```

APPLICATION LOG INFORMATION
MESSAGE BODY PORTION M305-1

```
<SessionInfo status="applicationLog" id ="579c3c99">
 <From> sip:cl1@hitachi.com </From>
 <To> sip:sv1@hitachi.com</To>
 <CallID> 1e51as35d4fa63s@hitachi.com</CallID>
 <Log>
   <Date> 2007-01-03T15:20:34+09:00 </Date>
   <Message>Contents A</Message>
   <Payment>500</Payment>
 </Log>
</SessionInfo>
```

DATA COMMUNICATION SYSTEM ENABLING DATA COMMUNICATION BETWEEN COMMUNICATION DEVICES THROUGH A SERVER

INCORPORATION BY REFERENCE

This application claims priority based on a Japanese patent application, No. 2007-233538 filed on Sep. 10, 2007, the entire contents of which are incorporated herein by reference.

BACKGROUND

The present invention relates to a data communication method and system, and more particularly, to a data communication method and system that enable data communication between communications devices using a session management server.

When data is communicated between two entities (herein referring to a device, or a process realized by executing software on a device, for example), a communication control protocol independent of the data communication may be used in order to control operations such as enabling or terminating the data communication. For example, in the case of Internet telephony, a protocol known as SIP (Session Initiation Protocol) is widely used as the communication control protocol. (For detailed information regarding SIP, see IETF, RFC 3261, "SIP: Session Initiation Protocol", http://www.ietf.org/rfc/rfc3261.txt. The above documentation will be hereinafter referred to as Document 1).

Hereinafter, a procedure for enabling data communication will be briefly described, wherein a first communications device establishes a communication session (hereinafter, referred to simply as a session) with a second communications device using a session management server that manages communication sessions established between communications devices.

In the present specification, a session refers to a series of data communication sequences carried out between communications devices. In SIP, for example, a session starts with the exchange of an INVITE message and corresponding 200 OK and ACK messages, and ends with the exchange of a BYE message and a corresponding 200 OK message.

First, prior to the processing to establish a communication session, the second communications device registers its own IP address in the session management server. More specifically, the communications device transmits, to the session management server, a registration request message (also called a REGISTER message) that includes both an identifier (also called a SIP-URI) for identifying the communications device or the user thereof in the session management server, as well as the IP address of the communications device. The session management server then records the identifier and the IP address specified in the registration request message as being associated with each other.

The association between the identifier and the IP address of a given communications device that is recorded in the session management server is deleted when a period of validity expires, the period of validity having been set when the association was recorded. Alternatively, the association may also be deleted as a result of the communications device transmitting a delete registration request message. (For example, the delete registration request message may be similar to the above REGISTER message, with instructions to set the period of validity for the association to 0.)

In addition, in the present specification, when a particular communications device (entity) is in a state such that the identifier and the IP address of the communications device are recorded as being associated with each other in the session management server, that communications device may be said to be logged in to the session management server. Similarly, for the state wherein such an association is not recorded, that communications device may be said to be logged out of the session management server. In other words, at this point in the present example, the second communications device is logged in to the session management server.

Similarly, prior to the processing to establish a session, the first communications device also logs in to the session management server.

Next, the first communications device conducts processing to establish a session with the second communications device.

More specifically, the first communications device transmits to the session management server a connection request message (hereinafter, also referred to as an INVITE message) that requests the establishment of a session with the second communications device. In the INVITE message, the identifier of the first communications device and the identifier of the second communications device are identified. Upon receiving the INVITE message, the session management server forwards the INVITE message to the second communications device. Upon receiving the INVITE message, if the second communications device accepts the connection request, then the second communications device transmits to the session management server a response message (also known as a 200 OK message) indicating acceptance of the connection request. The session management server then forwards the received 200 OK message to the first communications device. The first communications device then receives the response message, and thus a communication session with the second communications device is established.

The above thus describes the series of steps whereby a first communications device uses a session management server to establish a session with a second communications device according to SIP, thereby enabling data communication between the two communications devices.

Given its high expandability, SIP is used as a communication control protocol between users and content providers for various multimedia services, including not only Internet telephony, but also instant messaging services and content delivery services, for example. SIP is also used in IMS (IP Multimedia Subsystem) as the underlying network technology for NGN (Next Generation Network).

IMS is a communications architecture for realizing multimedia services, such as content delivery and Internet telephony, over an IP network. Among the elements constituting IMS, a SIP server called the CSCF (Call Session Control Function) serves a major role.

The CSCF facilitates SIP-based data communication between, for example, a user-side or service-side communications device coupled to the IMS, and an application server (hereinafter referred to as an AS) that provides various functions to nodes in the IMS. There are three types of CSCF: P-CSCF (Proxy-CSCF), which processes user access; I-CSCF (Interrogating-CSCF), which serves as a gateway to another network; and S-CSCF (Serving-CSCF), which conducts session control.

The I-CSCF and S-CSCF use the Diameter protocol to conduct data communication with a home subscriber server (hereinafter referred to as an HSS) that stores user information and filter criteria. Diameter is a protocol used for AAA (Authentication, Authorization, and Accounting). Filter criteria is data to be cross-checked with a message received by the S-CSCF, and describes parameters for determining whether or not it is necessary to use an AS to process the message. (For detailed information regarding IMS, see 3GPP, 3GPP TS 23.228: IP Multimedia Subsystem (IMS) Stage 2, http://www.3gpp.org/ftp/Specs/html-info/23228.htm. The above documentation will be hereinafter referred to as Document 2).

Depending on the types of services provided, content providers providing multimedia services are required to equip service-providing communications devices (i.e., service-side communications devices) with functions required when establishing sessions, such as a function for controlling access to services, or a function for generating a session key used for encrypted communication between a user and a service.

However, if the functions required when establishing sessions are loaded onto individual service-side communications devices, there is a problem in that high costs are required for software development, implementation, maintenance, and other operations to be performed on each service-side communications device. Moreover, each service-side communications device needs considerable computational resources in order to realize the functions required when establishing sessions, and the amount of data that must be managed is also increased.

In order to solve this problem, another method is being considered wherein, instead of distributing single or plural processes required when establishing sessions to each service-side communications device, such processes are executed in the session management server, or in a server cooperating with the session management server, in order to achieve unification of the functions.

In IMS, for example, it becomes possible to reduce the burden on the service-side communications devices by having the AS (i.e., the SIP server) conduct supplemental services such as QoS control and key generation.

In addition, JP-A-2005-284753 (hereinafter, Document 3) describes a session management server (being a SIP server) provided with a function for determining whether to permit or deny the provision of a service to a user, as well as a function for transmitting a configure session request packet to the service-side communications device when it is determined that provision of the service is permitted.

The sequence leading up to the establishment of a session by a user-side communications device with a service-side communications device via a SIP server in accordance with Document 3 will now be described. The SIP server first receives an INVITE message, from the user-side communications device, that is directed toward the service-side communications device. In the standard SIP procedure specified in Document 1, the SIP server immediately forwards the INVITE message to the service-side communications device. However, in the procedure described in Document 3, a procedure is added prior to forwarding the INVITE message, wherein the user-side communications device queries a subscriber management server to determine whether or not the user has rights to receive the service of the service-side communications device.

If the rights decision results in information being sent to the SIP server indicating that the user has the above rights, then the SIP server forwards the INVITE message to the service-side communications device. Subsequently, by following a procedure similar to that of Document 3, the communications device used by the user who has the rights to receive the service of the service-side communications device is able to establish a session with the service-side communications device.

As indicated above, Document 3 discloses a method wherein the function to determine whether to permit or deny the provision of a service is provided in a unified manner in the subscriber management server, without providing the function to individual service-side communications devices. In so doing, the costs of conducting subscriber management processing in the service-side communications devices are reduced.

SUMMARY OF THE INVENTION

In the method described in Document 1, upon receiving an INVITE message from the user-side communications device, the session management server waits until the processing conducted by the subscriber management server to decide whether the provision of a service is permitted or denied is finished before forwarding the INVITE message to the service-side communications device. For this reason, the time required by the decision processing directly affects the overall time required to establish a session. Thus there is a problem in that, under conditions wherein the decision processing requires a large amount of time, session establishment also requires a large amount of time.

Furthermore, if the service-side communications device is unable to provide the service due to an internal server error or other cause, then the user-side communications device will receive an error message for that error after the processing to decide whether provision of the service is permitted or denied has finished. Thus there is a problem in that, under conditions wherein the decision processing requires a large amount of time, user wait time is also increased for receiving an error message unrelated to the user's access rights.

Among the processes required for establishing a session, since the results of a single process affect the other processes, methods of the conventional art conducted processes sequentially, with each process waiting for the results of another process. In contrast, the present invention provides a data communication system that is able to reduce processing time by conducting the above plurality of processes in parallel.

The present invention provides a data communication system wherein a session management server that manages a session to be established between communications devices conducts, in parallel, processing to forward communication messages required for establishing the session that are exchanged between the communications devices, as well as processing required for establishing the session that is conducted by issuing requests to one or more other function-providing devices.

More specifically, the session management server provided by the present invention executes processing to forward an INVITE message that requests the establishment of a session and is received from the user-side communications device, in parallel with a query or processing request to determine whether or not the user has rights to receive the service using the session to be established. The above processes are conducted in parallel: for example, both processes are conducted before receiving the results of either process. The recipient of the query or processing request may be another device such as a function-providing server.

More specifically, in the present invention, the session management server transmits the INVITE message to the service-side communications device before receiving a requested result from each function-providing server conducting processing required for session establishment, such as a rights decision server that determines the user's rights, or a key generation server that generates a session key. The timing whereby a message for a query or processing request is transmitted to a function-providing server may be either before or after the INVITE message is transmitted.

Upon receiving from the service-side communications device a message indicating that a service can be provided with respect to the forwarded INVITE message, the session management server transmits to the service-side communications device a response to the message indicating that a service can be provided. If any result from the one or more function-providing servers has remained being unreceived after transmitting the response, the session management server waits for the results from the one or more function-providing servers.

Alternatively, if the session management server receives from a function-providing server a message permitting the provision of a service by the service-side communications device as the result of the requested processing, then the session management server transmits to the function-providing server a response to the permitted message. If any result from the one or more function-providing servers has remained being unreceived after transmitting the response, the session management server waits for the result of the requested processing issued to a function-providing server, and/or a result with respect to the request transmitted to the service-side communications device.

According to the features described above, in the present invention, the session management server transmits an INVITE message to the service-side communications device while the question of whether or not the user-side communications device has rights to receive the service is still uncertain. Upon receiving the INVITE message, the service-side communications device transmits a 200 OK message in response to the session management server, following the standard SIP procedure specified in Document 1. The service-side communications device then transitions to a state wherein the session with the user-side communications device has been established.

Since this processing is executed regardless of whether or not the user-side communications device has rights to receive the service, there is a possibility that the service-side communications device might transition to a state wherein a service is provided to a user-side communications device that does not have rights to receive the service.

Consequently, in order to eliminate the possibility that the service-side communications device will provide a service to the communications device of a user who does not have rights to receive the service, the present invention conducts the following. If it is determined that the user does not have rights to receive the service, then the session management server executes processing, such as transmitting a cancel message, for example, to terminate the session with the service-side communications device.

More specifically, if the session management server is able to confirm that the user does not have rights to receive the service, then the session management server transmits to the service-side communications device a SIP message to cancel the establishment of the session. The transmitted SIP message uses a BYE message or a CANCEL message, according to the state of the service-side communications device.

In addition, if, after receiving an affirmative response from the service-side communications device, the session management server receives from a function-providing server a processing result required for receiving the provision of a service, then the session management server transmits a message to add required information to the service-side communications device.

In addition, if a message denying the provision of a service is received from the service-side communications device with respect to the forwarded request message, then a cancel message for canceling the processing issued as a request to a function-providing server may be transmitted to one or more function-providing servers.

If the session management server receives responses from the service-side communications device and all of the function-providing servers that were issued processing requests, then the session management server transmits required information to the service-side communications device, and after confirming that the service-side communications device has transitioned to a state enabling provision of the service, the session management server transmits to the user-side communications device a response message with respect to the request message.

According to the above configuration, the session management server executes processing to forward the connection request message and connection response message exchanged between the communications devices in parallel with processing required for establishing a session that is issued as requests to other function-providing servers. As a result, it is possible to reduce the time required for establishing a session.

Furthermore, according to the above configuration, the session management server executes processing to forward error messages transmitted from a communications device in parallel with processing required for establishing a session that is issued as requests to other function-providing servers. As a result, it is possible to reduce the time until an error message reaches the user.

Furthermore, according to the above configuration, in the case where the service-side communications device is unable to provide the service, the wait time is reduced between the transmission of a session establishment request message by the user and the receiving of the error message by the user-side communications device.

According to the present invention, processing to determine whether to permit or deny the provision of a service can be conducted at high speeds using a session management server working in cooperation with one or more function-providing servers.

These and other benefits are described throughout the present specification. A further understanding of the nature and advantages of the invention may be realized by reference to the remaining portions of the specification and the attached drawings.

BRIEF DESCRIPTION OF THE DRAWINGS

FIG. 5 is a diagram illustrating a process flow of the SIP server 10 conducted after the user-side communications device 41 and the service-side communications device 42 have logged in to the SIP server 10, in accordance with the Embodiment 1;

FIG. 7 is a diagram illustrating information saved in a session log DB 70, a rights DB 80, and an application log DB 50, in accordance with the Embodiment 1;

FIG. 8 is a diagram illustrating, messages transmitted and received by the SIP server 10 with respect to a rights decision server 20, a key generation server 40, and the service-side communications device 42, in accordance with the Embodiment 1;

FIG. 9 is a diagram illustrating a message received by an accounting server 30, in accordance with the Embodiment 1;

DETAILED DESCRIPTION OF THE EMBODIMENTS

Hereinafter, embodiments of the present invention will be described with reference to the attached drawings. It should be appreciated that the present invention is not limited by the embodiments described below.

In addition, although application embodiments of the present invention as applied to SIP will be described hereinafter, the present invention could be also applied to systems other than SIP, wherein session establishment request messages and response messages are sent and received via a session management server when establishing a communication session.

Figure 2:
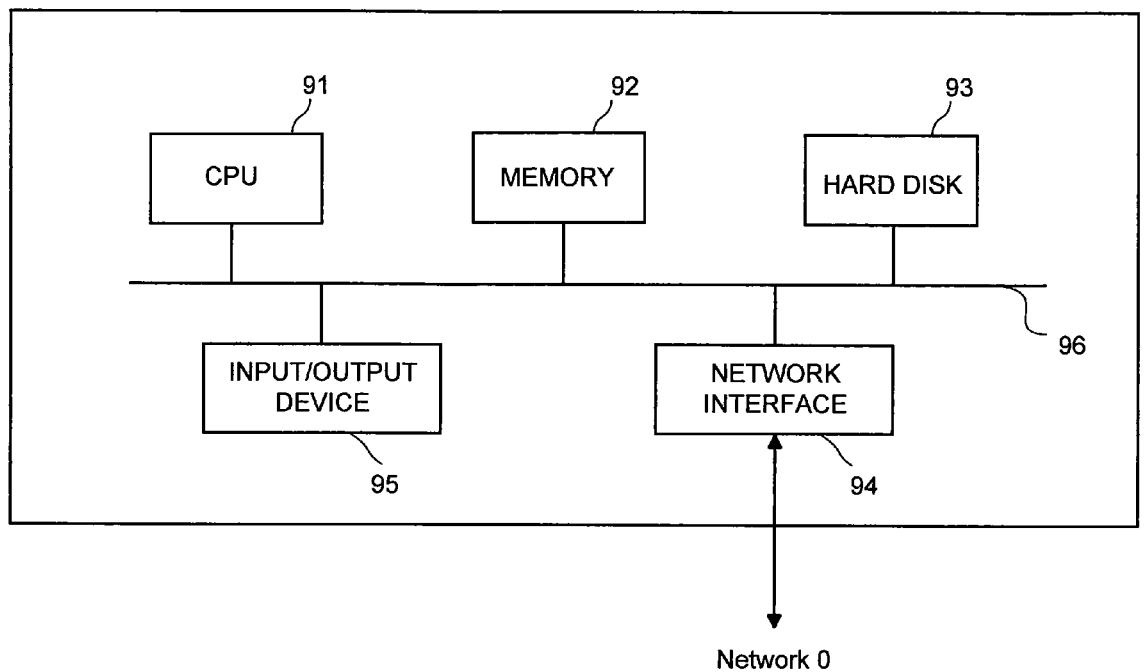
FIG. 2 is a block diagram illustrating hardware configurations for each device used in Embodiment 1 and Embodiment 2.

Moreover, each device in each of the embodiments below is realized, for example, by means of a general electronic computer configured by a processor (CPU) 91, memory 92 and/or a hard disk 93 for storing data and various software (programs) executed by the processor 91, a network interface 94 for coupling to a network 0, and an input/output device 95 that includes input devices such as a mouse and keyboard, a display device, and a device that reads from and writes to an external storage medium, wherein the respective configuration elements are mutually coupled by means of a bus or similar internal communication line 96. A constituent embodiment of the above computer is shown in FIG. 2.

In other words, the processing units and processing conducted thereby that are provided by each device in the following embodiments are realized as a result of the processor 91 in each respective device executing, at required timings, a program that realizes a respective processing unit, the program being stored in the hard disk 93 or the memory 92. In the description of the embodiments hereinafter, each processing unit is described as an independent entity executing the processing of a respective processing unit for the sake of convenience. It should be appreciated that the program may also be referred to as code or a module.

The program executed by the processor 91 may be stored in the hard disk 93 or the memory 92 of each device in advance, or may be introduced into a storage unit when needed from another device via a medium useable by the device. A medium herein refers to, for example, a detachable storage medium useable by the input/output device 95, or a communications medium useable via the network interface 94 (i.e., a network, or a carrier wave or digital signal that propagates the network). Furthermore, the respective processing units described above may also be configured as integrated circuits or similar hardware.

The specific identifiers used in the following embodiments, such as domain names, URLs, URIs, and IP addresses, are all imaginary constructs for the sake of explanation, and are not related to any actual identifiers, even if such identifiers exist.

Embodiment 1

First, a first embodiment of data communication in accordance with the present invention will be described with reference to FIGS. 1 to 14.

Figure 1:
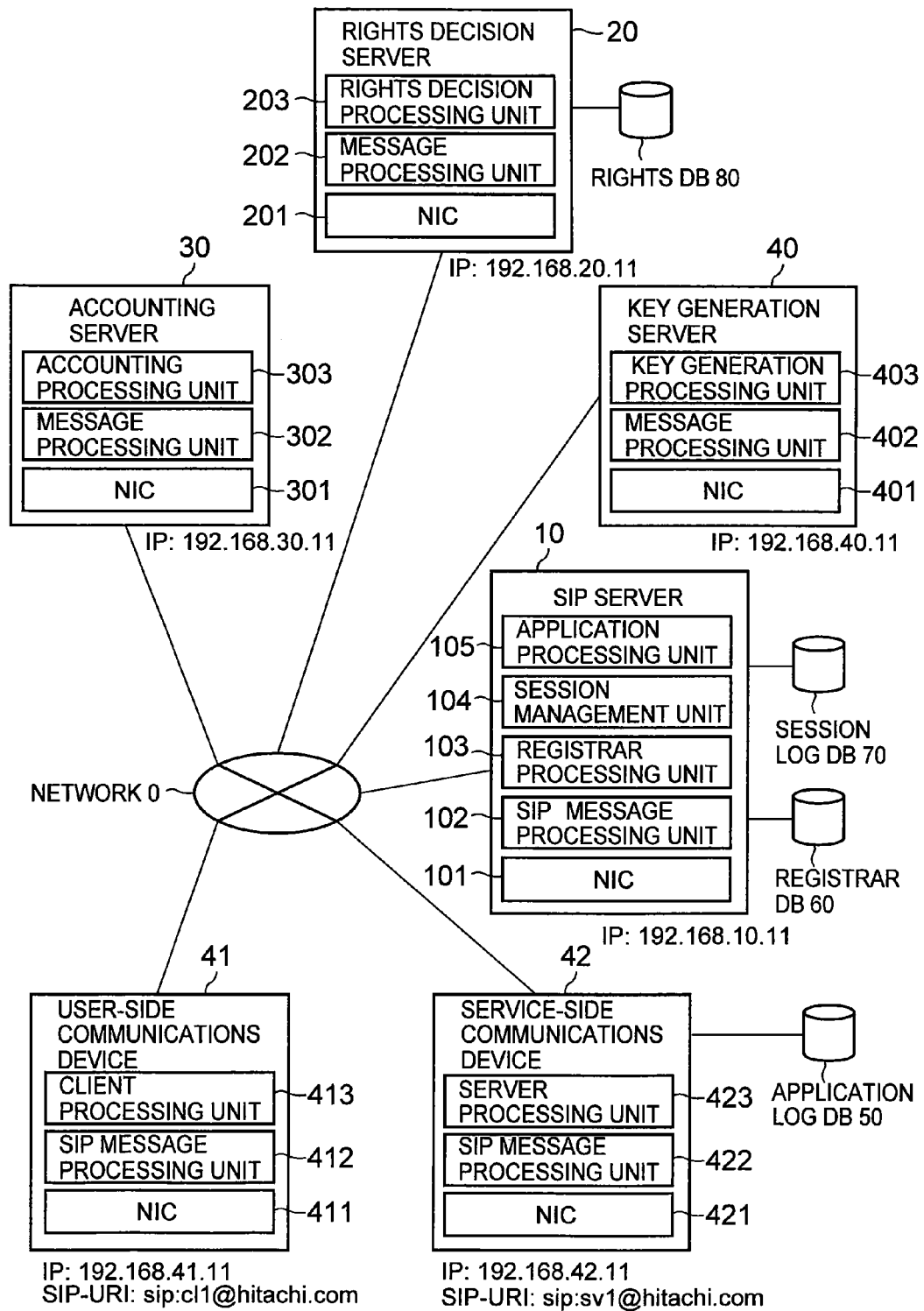
FIG. 1 is a diagram illustrating a system configuration in accordance with an Embodiment 1.

FIG. 1 is a diagram illustrating a system configuration in accordance with the Embodiment 1 of the present invention. The system shown in FIG. 1 is configured to include a SIP server 10 that acts as a session management server, a rights decision server 20, an accounting server 30, a key generation server 40, a user-side communications device 41 used by a user for communicating data with a service, and a service-side communications device 42 that provides the service. The servers and communications device are coupled via a network 0.

An IP address of 192.168.10.11 is assigned to the SIP server 10, and the SIP server 10 is provided with a registrar DB 60 for managing a communications terminal logged in the SIP server 10, as well as a session log DB 70 for managing information about communication sessions managed by the SIP server 10.

The SIP server 10 includes, for example, a network interface card unit (NIC) 101 for communicating with other servers and communications devices via the network 0, a SIP message processing unit 102 for processing SIP messages, a registrar processing unit 103 for controlling processing involving the registrar DB 70, a session control unit 104 for controlling processing involving a session log DB 41, and an application processing unit 105 for processing communications with the rights decision server and the accounting server. FIG. 7 shows an example of session log information saved in the session log DB 70.

An IP address of 192.168.20.11 is assigned to the rights decision server 20, and the rights decision server 20 is provided with a rights DB 80 that manages rights information regarding whether or not each user is able to receive the service of the service-side communications device.

Herein, since the service provided from the service-side communications device to the user-side communications device is provided over a session established between the communications devices, the user having rights to receive the service from the service-side communications device can be considered to also have rights to establish a session with the service-side communications device. Therefore, the subject of management by the rights DB 80 includes not only rights to receive the service, but also rights to establish a session.

The rights decision server 20 includes, for example, a network interface card unit (NIC) 201 for communicating with other servers and communications devices via the network 0, a message processing unit 202 that processes rights decision request messages, and a rights decision processing unit 203 that controls processing involving the rights DB 80. FIG. 7 shows an example of rights information saved in the rights DB 80.

An IP address of 192.168.30.11 is assigned to the accounting server 30. The accounting server 30 includes, for example, a network interface card unit (NIC) 301 for communicating with other servers and communications devices via the network 0, a message processing unit 302 that processes accounting processing request messages, and an accounting processing unit 303 that executes accounting processing generated according to the service provided by the service-side communications device on the basis of a processing request.

An IP address of 192.168.40.11 is assigned to the key generation server 40. The key generation server 40 includes, for example, a network interface card unit (NIC) 401 for communicating with other servers and communications devices via the network 0, a message processing unit 402 that processes key generation processing request messages, and a key generation processing unit 403 that executes processing to generate a session key used for encrypted communication between the user-side communications device and the service-side communications device on the basis of a processing request.

Hereinafter, the rights decision server 20, the accounting server 30, and the key generation server 40 may be collectively referred to as function-providing servers.

An IP address of 192.168.41.11 and a SIP-URI of sip:cl1@hitachi.com are assigned to the user-side communications device 41. The user-side communications device 41 includes, for example, a network interface card unit (NIC) 411 for communicating with other servers and communications devices via the network 0, a SIP message processing unit 412 that processes SIP messages, and a client processing unit 413 that receives the service provided by the service-side communications device 42.

An IP address of 192.168.42.11 and a SIP-URI of sip:sv1@hitachi.com are assigned to the service-side communications device 42, and the service-side communications device 42 is provided with an application log DB 50 for recording information regarding the service provided by the service-side communications device 42. The service-side communications device 42 includes, for example, a network interface card unit (NIC) 421 for communicating with other servers and communications devices via the network 0, a SIP message processing unit 422 that processes SIP messages, and a server processing unit 423 that provides the service to the user-side communications device 41 and records the provision status in the application log DB 50. FIG. 7 shows an example of application log information saved in the application log DB 50.

Hereinafter, the communications sequence for the case wherein the user-side communications device 41 shown in FIG. 1 communicates data with the service-side communications device 42 will be described in accordance with the Embodiment 1.

Figure 3:
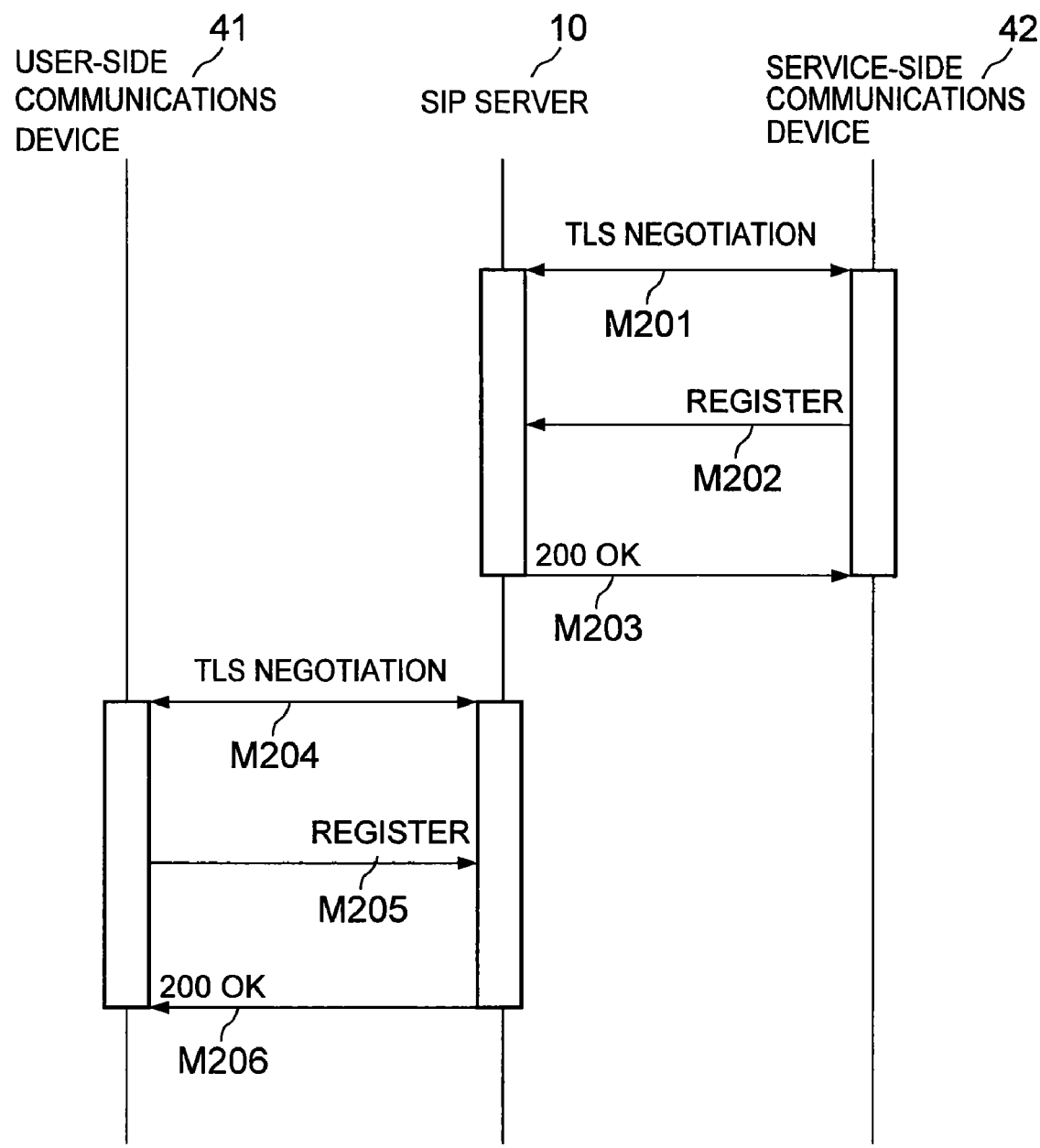
FIG. 3 is a diagram illustrating an exemplary sequence conducted when a user-side communications device 41 and a service-side communications device 42 execute processing to login to a SIP server 10, in accordance with the Embodiment 1.

First, the user-side communications device 41 and the service-side communications device 42 execute processing to log in to the SIP server, as shown in the sequence diagram in FIG. 3.

First, the service-side communications device 42 executes processing to log in to the SIP server 10. More specifically, the server processing unit 423 of the service-side communications device 42 conducts a TLS negotiation with the SIP server 10 (M201), thereby establishing TLS communication between the service-side communications device 42 and the SIP server 10.

Next, the SIP message processing unit 422 of the service-side communications device 42 generates a SIP REGISTER message M202 and then transmits the REGISTER message to the SIP server 10, thereby requesting location registration.

Upon receiving the REGISTER message, the registrar processing unit 103 of the SIP server 10 registers, in the registrar DB 60, location data that indicates a relationship between the request source (i.e., the communication source) SIP-URI (sip:sv1@hitachi.com) specified by the From header of the received REGISTER message, and the IP address of the request source (192.168.42.11) specified by the Contact header of the received REGISTER message. Subsequently, in order to notify the service-side communications device 42 of successful location registration, the SIP message processing unit 102 transmits a SIP 200 OK message M203 to the service-side communications device 42.

As a result of the above, the login of the service-side communications device 42 to the SIP server 10 is completed, and the service-side communications device 42 is able to accept service provision requests from the user-side communications device 41.

Subsequently, the user-side communications device 41 executes processing to log in to the SIP server 10. More specifically, the client processing unit 413 of the user-side communications device 41 conducts a TLS negotiation with the SIP server 10 (M204), thereby establishing TLS communication between the user-side communications device 41 and the SIP server 10.

Next, the SIP message processing unit 412 of the user-side communications device 41 generates a REGISTER message M205 as a SIP message, and then transmits the REGISTER message to the SIP server 10, thereby requesting location registration.

Upon receiving the REGISTER message, the registrar processing unit 103 of the SIP server 10 registers, in the registrar DB 60, location data that indicates a relationship between the request source SIP-URI (sip:cl1@hitachi.com) specified by the From header of the received REGISTER message, and the request source IP address (192.168.41.11) specified by the Contact header of the received REGISTER message. Subsequently, in order to notify the user-side communications device 41 of successful location registration, the SIP message processing unit 102 transmits a SIP 200 OK message M206 to the user-side communications device 41.

As a result of the above, the login of the user-side communications device 41 to the SIP server 10 is completed, and the user-side communications device 41 is able to issue a request to the service-side communications device 42 for provision of the service.

In order for the user-side communications device 41, having completed the login processing, to request provision of the service from the service-side communications device 42, the SIP message processing unit 412 generates a SIP INVITE message, and then transmits the INVITE message to the SIP server 10.

Figure 6:
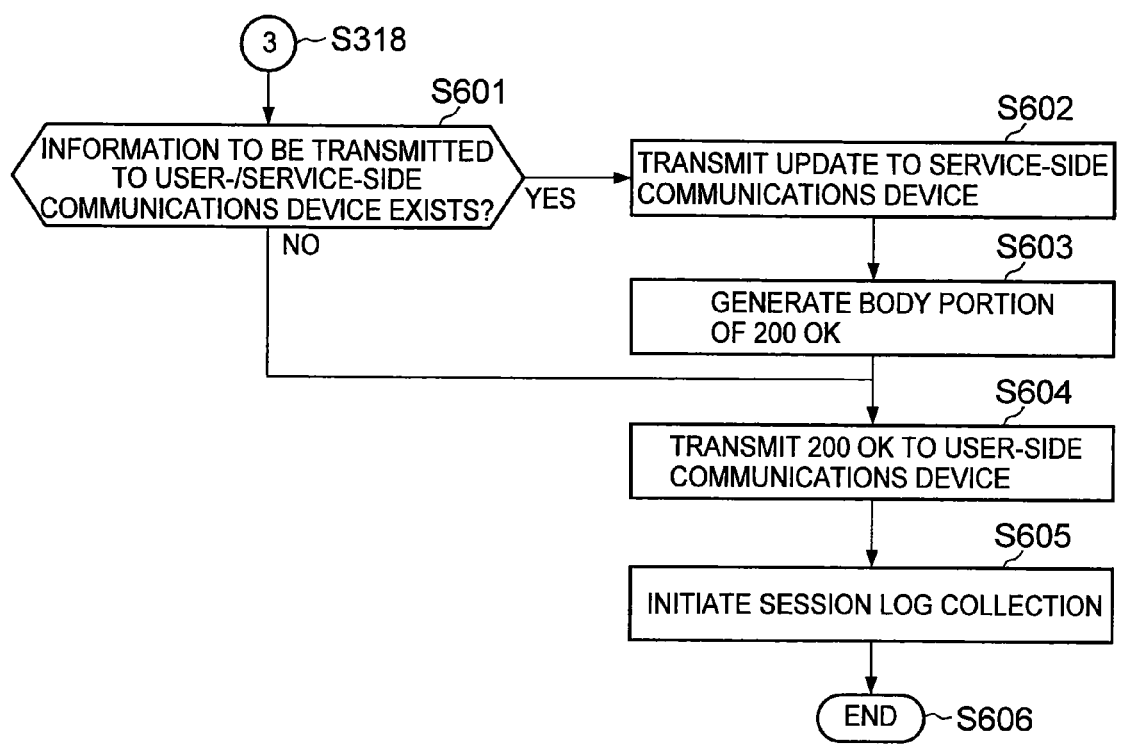
FIG. 6 is a diagram illustrating a process flow of the SIP server 10 conducted after the user-side communications device 41 and the service-side communications device 42 have logged in to the SIP server 10, in accordance with the Embodiment 1.

Hereinafter, the process flow of the SIP server 10 after receiving an INVITE message M101 from a user-side communications device 41 that has completed login processing will be described with reference to FIGS. 4 to 6.

Once the SIP server 10 has received the INVITE message M101, the registrar processing unit 103 first accesses the registrar DB 60 and searches for the IP address of the destination SIP-URI specified by the To header of the received INVITE message (S301).

If the corresponding IP address is not found in the registrar DB 60, the SIP message processing unit 102 of the SIP server 10 generates a SIP 404 Not Found message, transmits the 404 Not Found message to the user-side communications device 41 (S303) and then terminates the process (S304).

If the corresponding IP address is found in the registrar DB 60, the process proceeds to step S304, wherein the session management unit 104 of the SIP server 10 records the source SIP-URI specified by the From header of the INVITE message M101, the destination SIP-URI specified by the To header, identification information for the communication session specified by the Call-ID header, and information indicating that the communication session status is "establishing session (waiting for response from destination)" in the session log DB 70 together with the current time (S305).

The application processing unit 105 of the SIP server 10 then transmits a processing request to the function-providing server (S306). In the present embodiment, the application processing unit 105 transmits a rights decision request message M103 to the rights decision server 20, as well as a key generation request message M104 to the key generation server 40. In addition, the SIP message processing unit 102 of the SIP server 10 transmits an INVITE message M105 to the service-side communications device 42 (S307).

The rights decision request message M103 is created by the application processing unit 105, and its body portion has a message structure as illustrated in FIG. 8. More specifically, "request", which is the value of the status attribute of the Permission element, indicates that the message was transmitted to request a rights decision, while the value "358a1a77" of the id attribute is used as a value for uniquely identifying the message. The SIP-URI "sip:cl1@hitachi.com", which is the value of the From element, and the SIP-URI "sip:sv1@hitachi.com", which is the value of the To element, indicate that the rights decision request message M103 was transmitted when the user-side communications device 41 having an SIP-URI of sip:cl1@hitachi.com requested provision of the service from the service-side communications device 42 having an SIP-URI of sip:sv1@hitachi.com. 2007-01-03T15:20:33+09:00, which is the value of the Date element, indicates that the time when the rights decision request message was transmitted by the SIP server 10 is 15:20:33, Jan. 3, 2007.

In addition, the key generation request message M104 is created by the application processing unit 105, and its body portion has a message structure as illustrated in FIG. 8. More specifically, "request", which is the value of the status attribute of the KeyGen element, indicates that the message was transmitted to request key generation processing. The values of the From element, the To element, and the CallID element exist to identify the call requesting key generation, and the values respectively match the values of the From header, the To header, and the Call-ID header in the INVITE message M101. The value of the Date element is similar that of the rights decision request message M103. In addition, "AES256", which is the value of the scheme attribute of the Key element, indicates that the message requests the generation of a key on the basis of the AES (Advanced Encryption Standard) algorithm with a key length of 256 bits.

In addition, the INVITE message M105 is created as a result of the SIP message processing unit 102 adding a new Via header to the header portion of the INVITE message M101 received from the user-side communications device 41, and then decreasing the value of the Max-Forward header therein by 1.

Figure 4:
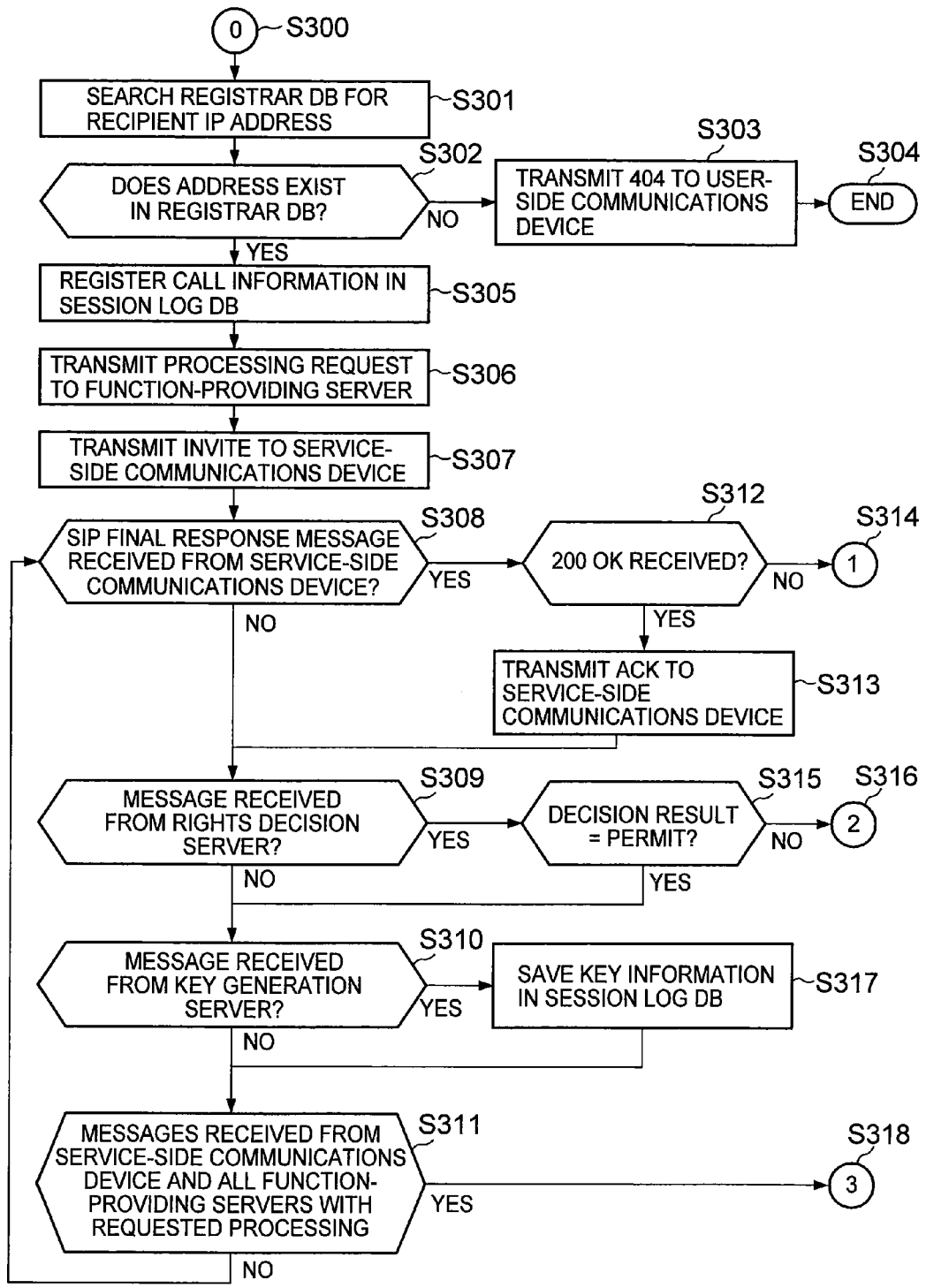
FIG. 4 is a diagram illustrating a process flow of the SIP server 10 conducted after the user-side communications device 41 and the service-side communications device 42 have logged in to the SIP server 10, in accordance with the Embodiment 1.

In FIG. 4, a processing order is followed such that the SIP server transmits an INVITE message to the service-side communications device after transmitting the processing request message to the function-providing server, but the present invention is not limited to this order. The processing request message transmitted to each function-providing server (in the present embodiment, the rights decision request message M103 transmitted to the rights decision server 20, or the key generation request message M104 transmitted to the key generation server 40) and the INVITE message transmitted to the service-side communications device can be transmitted in an arbitrary order.

After having transmitted the rights decision request message, the key generation request message, and the INVITE message, the SIP server 10 transitions to a state wherein the SIP server 10 waits for responses corresponding to the transmitted messages (S308, S309, S310, S311).

When a response message indicating a result with respect to one of the above request messages is received from the service-side communications device 42, the following is conducted (the response message herein being a SIP final response message, and not a provisional 1xx message, as such provisional response messages do not affect the processing of the present embodiment). If the SIP final response message is a 200 OK message permitting provision of the service, then the SIP message processing unit 102 of the SIP server 10 generates an ACK message for responding to the service-side communications device 42 with an acknowledgement, and then transmits the ACK message to the service-side communications device 42. Subsequently, the SIP message processing unit 102 returns to the standby state for messages indicating the results of the processing issued as requests to the function-providing server (S308, S312, S313).

On the other hand, if the SIP final response message received from the service-side communications device 42 is another message (not the 200 OK) denying provision of the service, (S308, S312, S314), then the SIP server 10 determines that the service-side communications device is in a state where service can not be provided to the user-side communications device. The SIP message processing unit 102 then generates an ACK message with respect to the received SIP final response message, and then transmits the ACK message to the service-side communications device 42 (FIG. 5, S401).

Next, the SIP message processing unit 102 of the SIP server 10 forwards a SIP error response message (i.e., a SIP response message other than 1xx or 2xx) transmitted from the service-side communications device 42 to the user-side communications device 41 (S402). Next, the SIP message processing unit 102 transmits messages to respectively cancel the processing request requesting a rights decision that was issued to the rights decision server 20 and the processing request requesting the generation of a key that was issued to the key generation server 40 (S403), and then terminates the process (S404).

It should be appreciated that the execution order of the above three processing steps (S401, S402, S403) is an example, and thus the present invention is not limited to the above order. Rather, it is possible to execute the above three processing steps in an arbitrary order.

At this point, the cancel rights decision message M145 transmitted by the application processing unit 105 of the SIP server 10 to the rights decision server 20 in step S403 has a body portion as illustrated in FIG. 8. More specifically, "cancel", which is the value of the status attribute of the Permission element, indicates that the message was transmitted to cancel the rights decision request, while "358a1a77", which is the value of the id attribute, matches the value of the id attribute contained in the rights decision request message corresponding to the present cancel message. The SIP-URI "sip:cl1@hitachi.com", which is the value of the From element, and the SIP-URI "sip:sv1@hitachi.com", which is the value of the To element, indicate that the cancel rights decision message M145 was transmitted in order to cancel the decision processing regarding service-receiving rights that was transmitted as a processing request by the SIP server 10 to the rights decision server 20 when the user-side communications device 41 having a SIP-URI of sip:cl1@hitachi.com requested provision of the service from the service-side communications device 42 having a SIP-URI of sip:sv1@hitachi.com. 2007-01-03T15:20:34+09:00, which is the value of the Date element, indicates that the time when the cancel rights decision message M145 was transmitted by the SIP server 10 is 15:20:34, Jan. 3, 2007.

In addition, the cancel key generation message M124 transmitted by the application processing unit 105 of the SIP server 10 to the key generation server 40 in step S403 has a body portion as illustrated in FIG. 8. More specifically, "cancel", which is the value of the status attribute of the KeyGen element, indicates that the message was transmitted to cancel the key generation request. The values of the From element, the To element, and the CallID element match the value of the respective elements contained in the corresponding key generation request message. The value of the Date element is similar to that of the cancel rights decision message M145.

The foregoing thus describes the process flow of the SIP server 10 when a SIP final response message is received by the SIP server 10 from the service-side communications device 42.

Meanwhile, if the SIP server 10 receives a rights decision result message from the rights decision server 20 while waiting, then the following is conducted. If the rights decision result message is the rights decision result [Permit] message M112, then the SIP server 10 returns to a standby state and waits for other messages (S309, S315). Herein, the rights decision result [Permit] message M112 is created by the rights decision processing unit 203 of the rights decision server 20, and has a body portion as illustrated in FIG. 8. More specifically, "accept", which is the value of the status attribute of the Permission element, indicates that the result of the rights decision is such that the user-side communications device 41 has rights to receive the service of the service-side communications device 42, while the value "358a1a77" of the id attribute matches the value of the id attribute contained in the rights decision request message corresponding to the present rights decision result message.

If the rights decision result message received from the rights decision server 20 is the rights decision result [Deny] message M121 (i.e., the user-side communications device 41 does not have rights to receive the service of the service-side communications device 42), then the SIP server 10 immediately proceeds to processing to abort establishment of the session (S309, S315, S316). Herein, the rights decision result [Deny] message M121 is created by the rights decision processing unit 203 of the rights decision server 20, and has a body portion as illustrated in FIG. 8. More specifically, "reject", which is the value of the status attribute of the Permission element, indicates that the result of the rights decision is such that the user-side communications device 41 does not have rights to receive the service of the service-side communications device 42, while "358a1a77", which is the value of the id attribute, matches the value of the id attribute contained in the rights decision request message corresponding to the present message rights decision result message.

The process flow for aborting establishment of a session that is conducted by the SIP server 10 will now be described.

In order to indicate that the user-side communications device 41 does not have rights to receive the service of the service-side communications device 42, the SIP message processing unit 102 of the SIP server 10 generates a SIP 403 Forbidden message, and then transmits the 403 Forbidden message to the user-side communications device 41 (S501).

The application processing unit 105 of the SIP server 10 then transmits a cancel key generation message M122 to the function-providing server currently processing a request (i.e., the key generation server 40 in this case) (S502).

Next, the SIP message processing unit 102 of the SIP server 10 executes processing to cancel the request to couple to the service-side communications device 42. The sequence conducted by this processing differs according to whether or not the SIP server 10 has already received from the service-side communications device 42 a 200 OK message with respect to the INVITE. Hereinafter, the individual sequences for the above two possible cases will be described in order.

First, in the case where the SIP server 10 has already received from the service-side communications device 42 a 200 OK message with respect to the INVITE, the SIP message processing unit 102 of the SIP server 10 cancels the SIP dialog established with the service-side communications device 42 by transmitting a SIP BYE message to the service-side communications device 42 (S504), and then terminates the process (S505). Herein, the BYE message M124 is created by the SIP message processing unit 102 and has a body portion as illustrated in FIG. 8. More specifically, "cancel", which is the value of the status attribute of the SessionInfo element, is added to clearly indicate that the BYE message is not transmitted to announce the termination of an already-established session, but rather is transmitted to abort the processing to establish a session which has not yet been established. The SIP-URI "sip:cl1@hitachi.com", which is the value of the From element, and the SIP-URI "sip:sv1@hitachi.com", which is the value of the To element, indicate that the BYE message M124 was transmitted in order to abort the establishment of a session by a user-side communications device 41 having a SIP-URI of sip:cl1@hitachi.com with a service-side communications device 42 having a SIP-URI of sip:sv1@hitachi.com. The value of the Date element is similar to that of the cancel rights decision message M145.

Next, in the case where the SIP server 10 has not received from the service-side communications device 42 a 200 OK message with respect to the INVITE, the SIP message processing unit 102 aborts the attempted establishment of a session with the service-side communications device 42 by transmitting a CANCEL message to the service-side communications device 42 (S506).

In step S506, there exists the possibility that the CANCEL message transmitted by the SIP server 10 will not reach the service-side communications device 42 due to a communications failure on the network 0 or similar malfunction. If the message does not reach the service-side communications device 42, then the service-side communications device 42 will continue process start processing or similar processing for establishing a session, and then transmit to the SIP server 10 a 200 OK message that acts as a final response with respect to the INVITE. For this reason, it will appear to the service-side communications device 42 that a session has been established with the user-side communications device 41, and aborting the establishment of the session will not be achieved.

Consequently, regardless of whether or not the SIP message processing unit 102 of the SIP server 10 has transmitted a CANCEL message, if the SIP server 10 receives a 200 OK message from the service-side communications device 42 having both a Call-ID header identical to those of a previously-transmitted INVITE message or CANCEL message as well as a CSeq header containing the string "INVITE", then the SIP server 10 aborts the session established with the service-side communications device 42 by transmitting a BYE message to the service-side communications device 42 (S507, S504). The BYE message transmitted at this point is identical to that shown in FIG. 8. After transmitting the BYE message, the SIP server 10 terminates the process (S505).

If a fixed amount of time has elapsed since transmitting the CANCEL message to the service-side communications device 42, then the SIP server 10 assumes that the service-side communications device 42 has received the CANCEL message, and terminates the process (S508, S505).

The foregoing thus describes the process flow of the SIP server 10 conducted upon receiving a rights decision result message from the rights decision server 20.

Meanwhile, if the SIP server 10 receives a key generation result message M113 from the key generation server 40 while waiting, then the application processing unit 105 of the SIP server 10 saves the key information contained in the key generation result message in the session log DB 70 (S310, S317). More specifically, the SIP server 10 records, in the session log DB 70, the value of the Key element contained in the body portion of the key generation result message as session key information in a table entry corresponding to the values of the From element, the To element, and the CallID element contained in the body portion M113-1 of the key generation result message. Herein, the key generation result message M113 is created by the key generation processing unit 403 of the key generation server 40, and has a body portion as shown in FIG. 8. More specifically, "response", which is the value of the status attribute of the KeyGen element, indicates that the message was transmitted to forward the key obtained as the result of key generation. The values of the From element, the To element, and the CallID element match the values of the respective elements contained in the corresponding key generation request message. The value of the Date element is similar to that of the cancel rights decision message M145. In addition, "AES256", which is the value of the scheme attribute of the Key element, indicates that the information included in the Key element is a key of length 256 bits that is used in the AES algorithm, while the value of the OctetString element in the Key element indicates session key information.

The foregoing thus describes the process flow of the SIP server 10 conducted upon receiving a key generation result message from the key generation server 40.

Once the SIP server 10 in a standby state receives messages from all of the service-side communications device 42, the rights decision server 20, and the key generation server 40, the SIP server 10 transitions to the final processing for establishing a session (S311, S318).

In the final processing for establishing a session, the SIP server 10 first checks whether or not there exists information to be transmitted to the user-side communications device and the service-side communications device from among the information acquired from the function-providing server by the application processing unit 105 and subsequently recorded in the session log DB 70 (S601). More specifically, the information to be transmitted to the user-side communications device and the service-side communications device herein refers to information such as the session key information that was generated by the key generation server 40.

If there exists information to be transmitted to the user-side communications device and the service-side communications device, then the SIP server 10 conducts processing required for transmitting the information to the user-side communications device 41 and the service-side communications device 42 (S602, S603).

More specifically, the SIP server 10 first transmits an UPDATE message to the service-side communications device 42 (S602). The UPDATE message M114 is created by the SIP message processing unit 102, and includes, in the body portion thereof, the key information recorded in the session log DB 70.

Subsequently, if there exists information to be transmitted to the user-side communications device and service-side communications device, then the SIP message processing unit 102 of the SIP server 10 copies the key information recorded in the session log DB 70, and then generates the body portion of the 200 OK message M116 (S603).

The foregoing thus describes the process flow executed by the SIP server 10 to transmit information to each communications device if there exists such information to be transmitted to the user-side communications device and the service-side communications device.

In the final processing for establishing a session, the SIP message processing unit 102 of the SIP server 10 generates the header portion of the 200 OK message M116 by removing the Via header containing the URI of the SIP server 10 from the header portion of the 200 OK message M109 received from the service-side communications device 42, and then transmits the 200 OK message M116 to the user-side communications device 41 (S604). When there exists information to be transmitted to the user-side communications device and the service-side communications device, the body portion generated in step S603 is used for the body portion of the 200 OK message M116. If there does not exist information to be transmitted to the user-side communications device and the service-side communications device, then the message is transmitted without containing information in the body portion thereof.

Finally, the SIP server 10 initiates collection of the session log to be used by the accounting server 30 later during accounting processing (S605). More specifically, the session management unit 104 of the SIP server 10 records, in the session log DB 70, the current time as the start time of the communication session in the entry corresponding to the source SIP-URI specified by the From header, the destination SIP-URI specified by the To header, and the identification information for the communication session specified by the Call-ID header of the INVITE message M101. FIG. 7 shows an example of the session log information saved in the session log DB 70.

The foregoing thus describes the process flow of the SIP server 10 conducted upon receiving an INVITE message M101 from a user-side communications device 41 that has completed login processing.

Next, the sequence conducted when a user-side communications device 41 that has completed login processing requests the provision of a service from a service-side communications device 42 will be described with reference to FIGS. 10 to 14.

First, the sequence for the case wherein the user-side communications device 41 has rights to receive the service of the service-side communications device 42 will be described with reference to FIG. 10.

First, in the case where the user-side communications device 41 requests the provision of a service from the service-side communications device 42, the user-side communications device 41 transmits the SIP INVITE message M101 to the SIP server 10.

Upon receiving the INVITE message M101 from the user-side communications device 41, the registrar processing unit 103 of the SIP server 10, following the process flow S302, accesses the registrar DB 60 and searches for the IP address of the recipient SIP-URI specified by the To header of the received INVITE message. Upon discovery of the IP address of the registered user-side communications device 41, the session management unit 104 of the SIP server 10, following the process flow S305, records the source SIP-URI, the destination SIP-URI, the identification information for the communication session, and information indicating that the communication session status is "establishing session (waiting for response from destination)" in the session log DB 70 together with the current time (M102).

Next, the SIP server 10, following the process flow S306, transmits the rights decision request message M103 to the rights decision server 20, and transmits the key generation request message M104 to the key generation server 40. In addition, the SIP server 10, following the process flow S307, transmits the INVITE message M105 to the service-side communications device 42.

The rights decision request message M103 is created by the application processing unit 105, and has a body portion as shown in FIG. 8.

In addition, the key generation request message M104 is created by the application processing unit 105, and has a body portion as shown in FIG. 8.

In addition, the INVITE message M105 is created as a result of the SIP message processing unit 102 adding a new Via header to the header portion of the INVITE message M101 received from the user-side communications device 41, and then decreasing the value of the Max-Forward header therein by 1.

In FIGS. 10 to 14, the SIP server 10 transmits the rights decision request message M103, the key generation request message M104, and the INVITE message M105 in that order, but the present invention is not limited to this order. Rather, it is possible to transmit the above three messages in an arbitrary order.

Upon receiving the rights decision request message M103, the rights decision processing unit 203 of the rights decision server 20 queries the rights DB 80 for rights information (M106).

In addition, upon receiving the key generation request M104, the key generation processing unit 403 of the key generation server 40 initiates key generation processing (M107).

In addition, upon receiving the INVITE message M105, the server processing unit 423 of the service-side communications device 42 starts initialization processing (such as process start processing) required for service provision (M108).

Upon completion of the initialization processing, the SIP message processing unit 423 of the service-side communications device 42 generates the SIP 200 OK message M109, and then transmits the 200 OK message to the SIP server 10.

Upon receiving the 200 OK message M109 from the service-side communications device 42, the SIP message processing unit 102 of the SIP server 10, following the process flow S313, generates an ACK message M110 with respect to the 200 OK message, and then transmits the ACK message to the service-side communications device 42.

Upon receiving the ACK message M110 from the SIP server 10, the server processing unit 423 of the service-side communications device 42 initiates collection of records of provision of the service to the user-side communications device 41 (i.e., the application log) (M111). The application log is recorded in the application log DB 50. FIG. 7 shows an example of the application log information saved in the application log DB 50.

If the rights decision server 20 outputs a rights decision processing result confirming that the user-side communications device 41 has rights to receive the service of the service-side communications device 42, then the rights decision server 20 transmits the rights decision result [Permit] message M112 to the SIP server 10. The rights decision result [Permit] message M112 is created by the rights decision processing unit 203, and has a body portion as shown in FIG. 8.

Upon completion of the key generation processing, the key generation server 40 transmits the key generation result message M113 to the SIP server 10. The key generation result message M113 is created by the key generation processing unit 403, and has a body portion as shown in FIG. 8.

Upon receiving the key generation result message M113 from the key generation server 40, the application processing unit 105 of the SIP server 10, following the process flow S317, saves the key information contained in the key generation result message in the session log DB 70.

Upon receiving messages from the three devices (i.e., the service-side communications device 42, the key generation server 40, and the rights decision server 20), the SIP server 10, following the process flow S311, transitions to the final processing for establishing a session.

In the present embodiment, there exists session key information generated by the key generation server as information to be transmitted to the user-side communications device and the service-side communications device. For this reason, the SIP message processing unit 102 of the SIP server 10, following the process flow S602, generates the UPDATE message M114, and then transmits the UPDATE message M114 to the service-side communications device 42.

Upon receiving the UPDATE message M114 from the SIP server 10, the SIP message processing unit 422 of the service-side communications device 42 acquires the session key information contained in the body portion of the UPDATE message, and subsequently transmits to the SIP server 10 a 200 OK message M115 with respect to the UPDATE message. The service-side communications device 42 then transitions to a state enabling provision of the service to the user-side communications device 41.

In addition, the SIP message processing unit 102 of the SIP server 10, following the process flow S603, generates the body portion of the 200 OK message M116, and then merges the generated body portion with a header portion generated by removing the Via header containing the URI of the SIP server 10 from the header portion of the 200 OK message M109 received from the service-side communications device 42. Subsequently, the SIP message processing unit 102 transmits the merged message to the user-side communications device 41 as the 200 OK message M116.

Upon receiving the 200 OK message M116, the SIP message processing unit 412 of the user-side communications device 41 generates the ACK message M117, and then transmits the ACK message to the SIP server 10.

Upon receiving the ACK message M117 from the user-side communications device 41, the session management unit 104 of the SIP server 10, following the process flow S605, initiates collection of records of sessions between the user-side communications device 41 and the service-side communications device 42 (i.e., the session log). The collected records are saved in the session log DB 70 (M118).

According to the above sequence, a communication session is established between the user-side communications device 41 and the service-side communications device 42 (M119), and it becomes possible both for the user-side communications device 41 to access the service-side communications device 42, and for the service-side communications device 42 to provide information services to the user-side communications device 41. The communication between the user-side communications device 41 and the service-side communications device 42 is encrypted using the session key information obtained during the establishment of the session. In addition, collection of both the session log by the SIP server 10 and the application log by the service-side communications device 42 is continued until the session is released.

The foregoing thus describes the sequence in the case where the user-side communications device 41 has rights to receive the service of the service-side communications device 42.

In the foregoing sequence, the rights decision processing M106 conducted by the rights decision server 20, the key generation processing M107 conducted by the key generation server, and the process start or other processing M108 conducted by the service-side communications device 42 are executed in parallel. For this reason, the foregoing sequence is advantageous in that the time required until the initiation of communications is reduced compared to that of a conventional sequence wherein the respective processes are executed sequentially.

Figure 11:
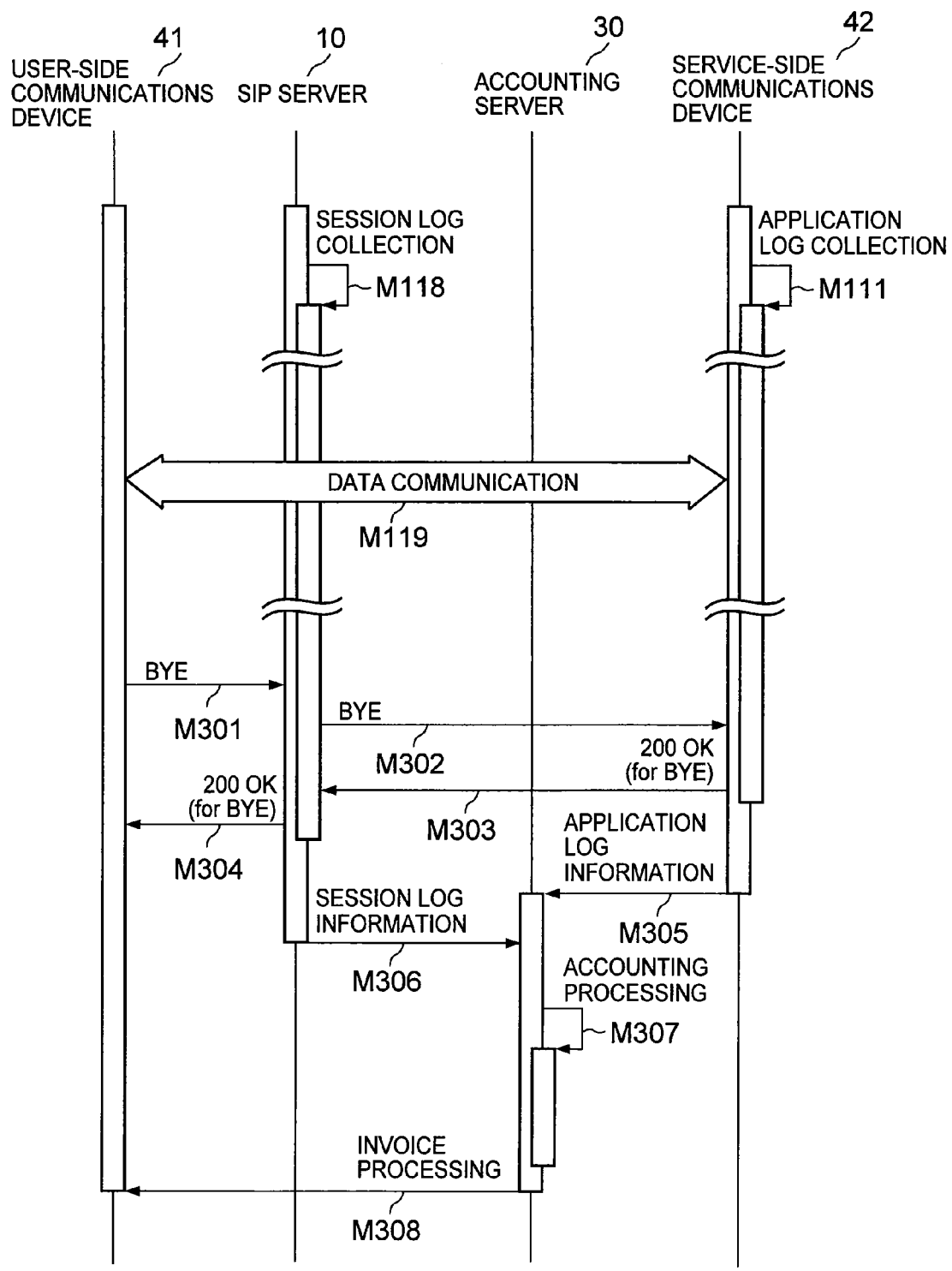
FIG. 11 is a diagram illustrating a sequence for the case wherein the user-side communications device 41 terminates a session with the service-side communications device 42, in accordance with the Embodiment 1.

Next, the sequence for the case wherein the user-side communications device 41 issues a request to the service-side communications device 42 to terminate the session will be described with reference to FIG. 11.

When the user-side communications device 41 issues a request to the service-side communications device 42 to terminate the session, the SIP message processing unit 412 first transmits the SIP BYE message M301 to the SIP server 10.

Upon receiving the BYE message M301 from the user-side communications device 41, the session management unit 104 of the SIP server 10 records, in the session log DB 70, information indicating that the communication session status is "terminating session (waiting for response from destination)" in the table entry corresponding to the values of the From element, the To element, and the CallID element contained in the body portion M113-1 of the key generation result message.

Subsequently, the SIP message processing unit 102 of the SIP server 10 generates a BYE message M302 by adding a new Via header to the header portion of the BYE message M301 and then decreasing the value of the Max-Forward header by 1. The SIP server 10 then transmits the generated BYE message M302 to the service-side communications device 42.

Upon receiving the BYE message M302 from the SIP server 10, the SIP message processing unit 422 of the service-side communications device 42 transmits to the SIP server 10 a 200 OK message M303 as a response to the BYE message. Subsequently, the server processing unit 423 terminates provision of the service to the user-side communications device 41, and stops collection of the application log. In addition, the SIP message processing unit 422 checks whether or not a SessionInfo element having a status attribute with the value "cancel" is contained in the body portion of the received BYE message M302. In the present sequence, such an element is not included in the body portion of the BYE message, and thus the service-side communications device 42 generates an application log information message M305, and then transmits the application log information message M305 to the accounting server 30. Herein, the application log information message M305 is created by the server processing unit 423, and has a body portion as shown in FIG. 9.

Upon receiving the 200 OK message M303 from the service-side communications device 42, the SIP message processing unit 102 of the SIP server 10 generates a 200 OK message M304 by removing the Via header containing the URI of the SIP server 10 from the header portion of received the 200 OK message, and then transmits the generated 200 OK message M304 to the user-side communications device 41. Next, the session management unit 104 records, in the session log DB 70, the current time as the session end time in the table entry corresponding to the source SIP-URI specified by the From header, the destination SIP-URI specified by the To header, and the identification information for the communication session specified by the Call-ID header of the 200 OK message M303, and then stops collection of the session log.

Subsequently, the SIP server 10 generates a session log information message M306 containing the session log information in the body portion thereof, and then transmits the session log information message M306 to the accounting server 30. Herein, the session log information message M306 is created by the session management unit 104, and has a body portion as shown in FIG. 9.

The foregoing thus describes the sequence for the case wherein the user-side communications device 41 issues a request to the service-side communications device 42 to terminate the session.

Figure 12:
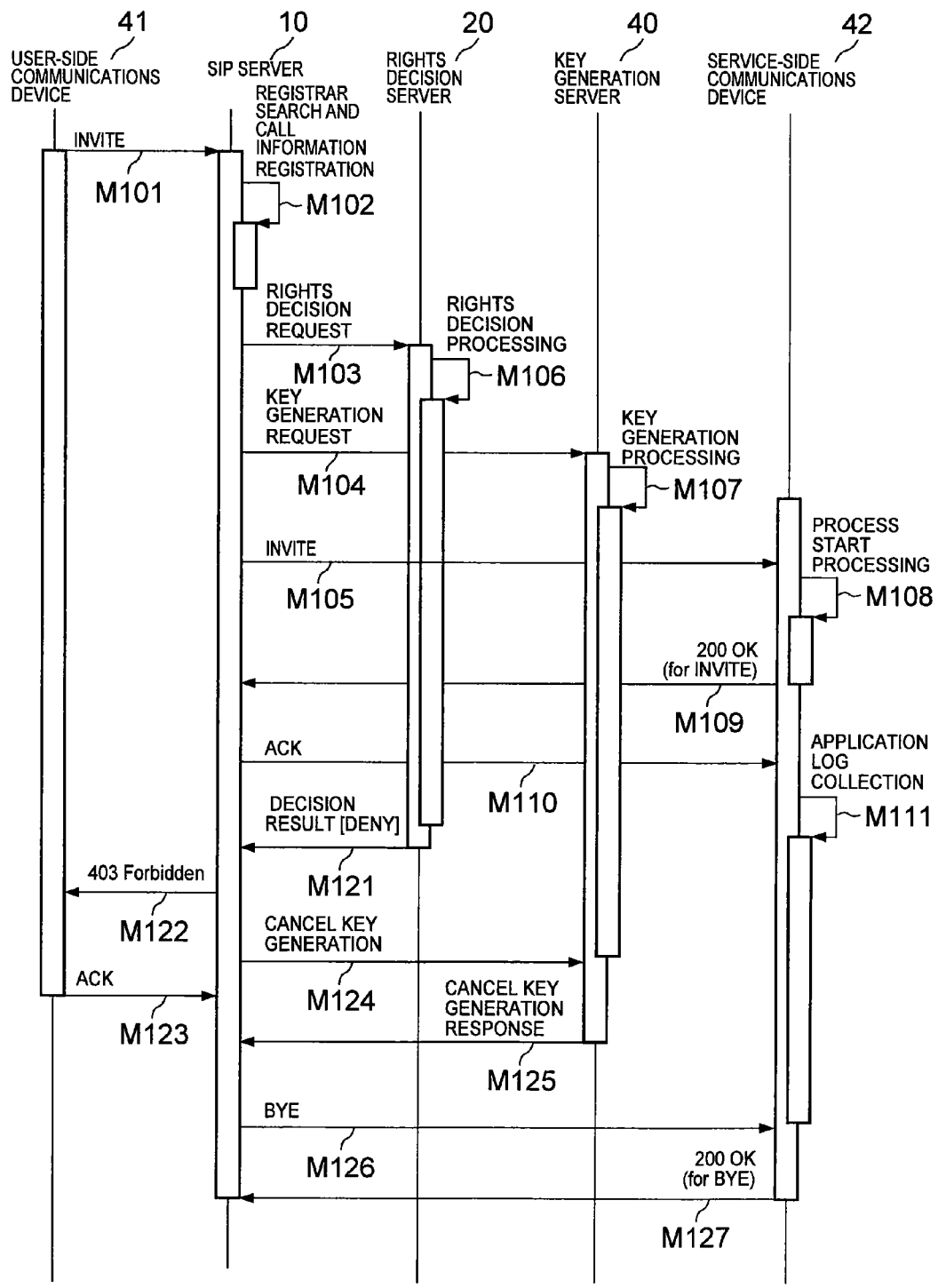
FIG. 12 is a diagram illustrating a sequence for the case wherein the service-side communications device 42 denies provision of a service to the user-side communications device 41, in accordance with the Embodiment 1.

Next, the sequence for the case wherein the user-side communications device 41 does not have rights to receive the service of the service-side communications device 42, and furthermore wherein a 200 OK message is issued from the service-side communications device 42 prior to the rights decision result, will be described with reference to FIG. 12.

Figure 10:
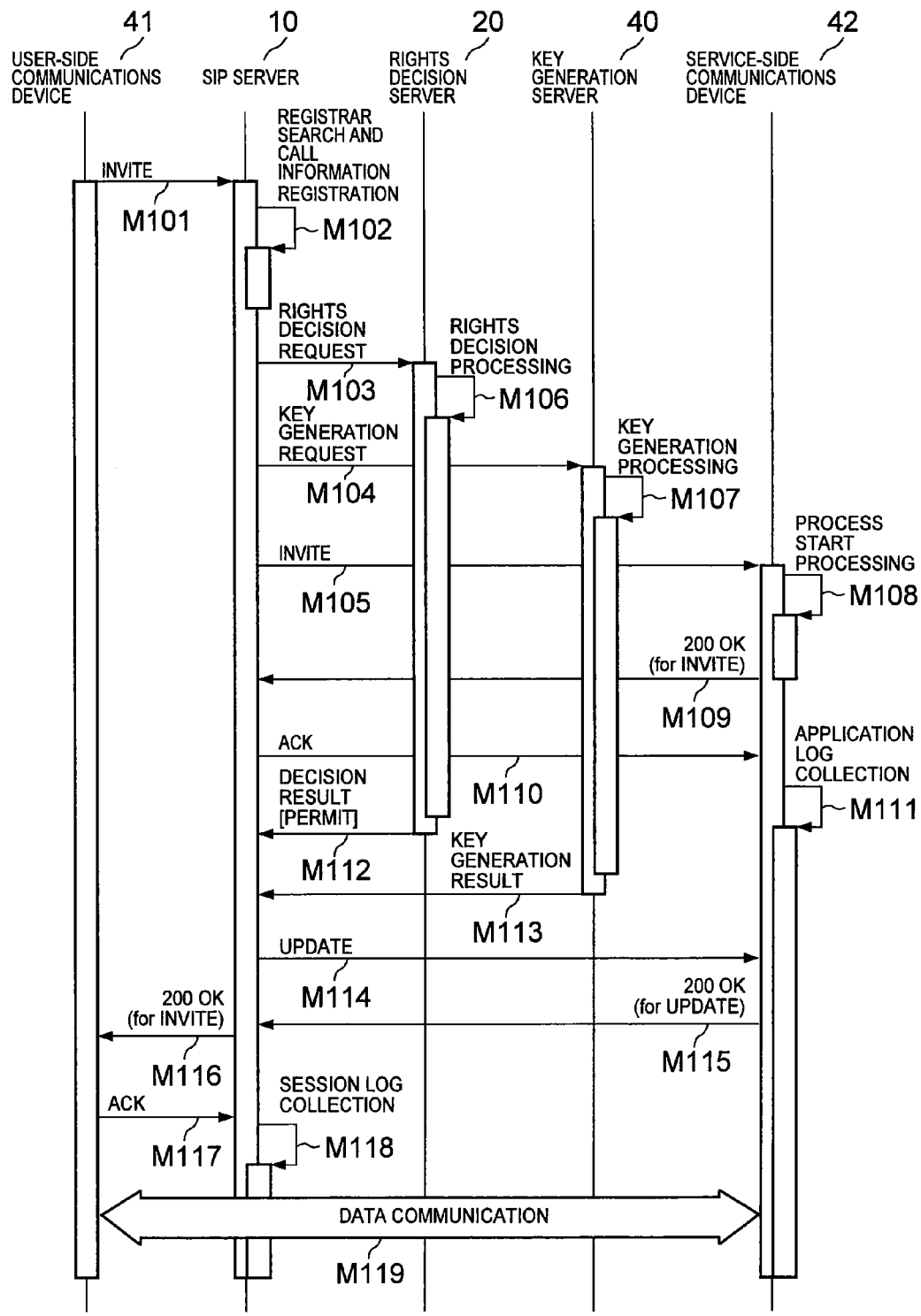
FIG. 10 is a diagram illustrating a sequence for the case wherein the user-side communications device 41 receives a service provided by the service-side communications device 42, in accordance with the Embodiment 1.

The sequence conducted from the transmission of the INVITE message M101 to the SIP server 10 by the user-side communications device 41 to the initiation of application log collection (M111) by the service-side communications device 42 is identical to the sequence shown in FIG. 10, and for this reason further description thereof will be omitted for the sake of brevity.

Subsequent to the above, if the rights decision server 20 outputs a rights decision processing result confirming that the user-side communications device 41 does not have rights to receive the service of the service-side communications device 42, then the rights decision server 20 transmits the rights decision result [Deny] message M121 to the SIP server 10. The rights decision result [Deny] message M121 is created by the rights decision processing unit 203, and has a body portion as shown in FIG. 8.

Upon receiving the rights decision result [Deny] message M121 from the rights decision server 20, the SIP message processing unit 102 of the SIP server 10, following the process flow S501, generates the SIP 403 Forbidden message M122, and then transmits the 403 Forbidden message to the user-side communications device 41.

Upon receiving the 403 Forbidden message M122 from the SIP server 10, the SIP message processing unit 412 of the user-side communications device 41 generates an ACK message M123, and then transmits the ACK message M123 to the SIP server 10.

After transmitting the 403 Forbidden message M122 to the user-side communications device 41, the SIP server 10, following the process flow S502, transmits the cancel key generation message M124 to the key generation server 40. The cancel key generation message M124 is created by the application processing unit 105, and has a body portion as shown in FIG. 8.

Upon receiving the cancel key generation message M124 from the SIP server 10, the key generation processing unit 403 of the key generation server 40 terminates the key generation processing that was being processed. Subsequently, the message processing unit 402 generates a cancel key generation response message M125, and then transmits the cancel key generation response message M125 to the SIP server 10. Herein, the cancel key generation response message M125 has a body portion as shown in FIG. 8.

An example of the body portion M125-1 of a cancel key generation response will now be described with reference to FIG. 8. The value "canceled", which is the value of the status attribute of the KeyGen element, indicates that the message was transmitted as a response to the cancel key generation request. The content of the KeyGen element is identical to the content of the KeyGen element in the body portion M124-1 of the corresponding cancel key generation message.

Next, the SIP server 10, following the process flow S503, determines whether or not a 200 OK message has been received from the service-side communications device 42. The present sequence covers the case wherein the 200 OK message has already been received from the service-side communications device 42 at this point, and thus the SIP server 10, following the process flow S504, transmits a BYE message M126 to the service-side communications device 42. The BYE message M126 is generated by the SIP message processing unit 102, and has a body portion as shown in FIG. 8.

Upon receiving the BYE message 126 from the SIP server 10, the SIP message processing unit 422 of the service-side communications device 42 generates a 200 OK message M127 as a response to the BYE message, and then transmits the 200 OK message M127 to the SIP server 10. Next, the server processing unit 423 of the service-side communications device 42 terminates the state enabling provision of the service to the user-side communications device 41, and then stops collection of the application log. In addition, the SIP message processing unit 422 checks whether or not a SessionInfo element having a status attribute with the value "cancel" is contained in the body portion of the received BYE message M126. In the present sequence, such an element is contained in the body portion of the BYE message, and for this reason the service-side communications device 42 does not transmit an application log information message to the accounting server 30.

Finally, the SIP server 10 receives from the service-side communications device 42 the 200 OK message M127 with respect to the BYE message, and then terminates the process.

The foregoing thus describes the sequence for the case wherein the user-side communications device 41 does not have rights to receive the service of the service-side communications device 42, and furthermore wherein a 200 OK message is issued from the service-side communications device 42 prior to the rights decision result.

The foregoing sequence is characterized in that the body portion of the BYE message used to cancel the SIP dialog temporarily established between the SIP server 10 and the service-side communications device 42 contains information indicating that the user-side communications device 41 was unable to establish a session (specifically the value "cancel", being the value of the status attribute of the SessionInfo element, as shown in the BYE message body portion M126-1 in FIG. 8). By including such information in the BYE message, the service-side communications device 42 is able to determine whether the received BYE message was transmitted in order to terminate the session, or to indicate that the processing to establish a session was aborted. Thus, the foregoing sequence is advantageous in that the transmission of unnecessary application logs to the accounting server 30 is prevented, and as a result, improper accounting processing can be prevented.

Figure 13:
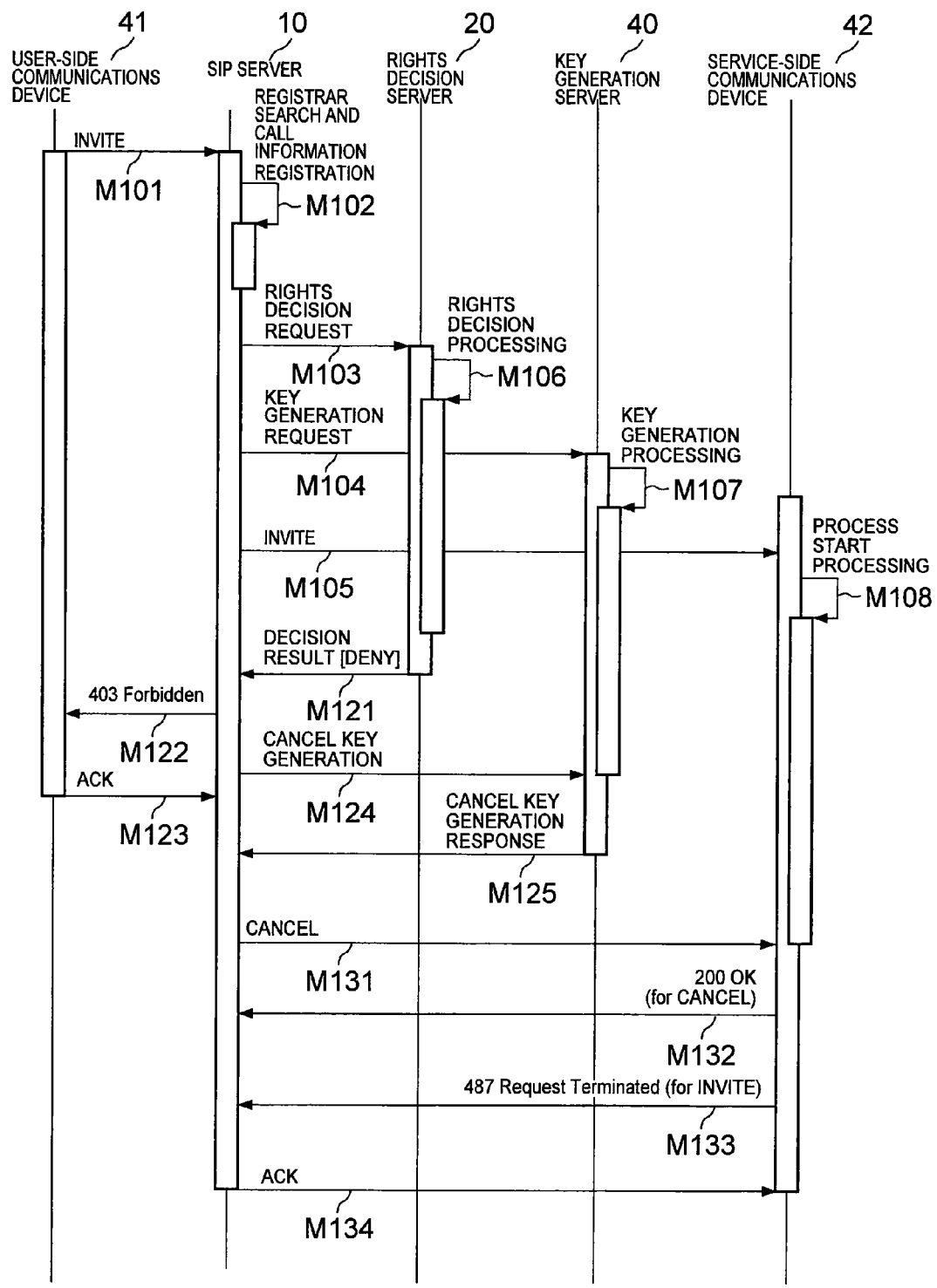
FIG. 13 is a diagram illustrating a sequence for the case wherein the service-side communications device 42 is unable to provide a service to the user-side communications device 41, in accordance with the Embodiment 1.

Next, the sequence for the case wherein the user-side communications device 41 does not have rights to receive the service of the service-side communications device 42, and furthermore wherein the rights decision result is issued prior to the 200 OK message from the service-side communications device 42, will be described with reference to FIG. 13.

The sequence conducted from the transmission of the INVITE message M101 to the SIP server 10 by the user-side communications device 41 to the initiation of process start or other processing (M108) by the service-side communications device 42 is identical to the sequence shown in FIG. 10, and for this reason further description thereof will be omitted for the sake of brevity.

Subsequent to the above, when the rights decision processing unit 203 of in the rights decision server 20 finishes rights decision processing prior to the transmission of the 200 OK message by the service-side communications device 42, wherein the rights decision result confirms that the user-side communications device 41 does not have rights to receive the service of the service-side communications device 42, then the rights decision server 20 transmits the rights decision result [Deny] message M121 to the SIP server 10. The rights decision result [Deny] message M121 is created by the message processing unit 202, and has a body portion as shown in FIG. 8.

Upon receiving the rights decision result [Deny] message M121 from the rights decision server 20, the SIP message processing unit 102 of the SIP server 10, following the process flow S501, transmits the 403 Forbidden message M122.

Upon receiving the 403 Forbidden message M122 from the SIP server 10, the SIP message processing unit 412 of the user-side communications device 41 generates the ACK message M123, and then transmits the ACK message to the SIP server 10.

After transmitting the 403 Forbidden message M122 to the user-side communications device 41, the SIP server 10, following the process flow S502, transmits the cancel key generation message M124 to the key generation server 40. The cancel key generation cancellation message M124 is created by the application processing unit 105, and has a body portion as shown in FIG. 8.

Upon receiving the cancel key generation message M124 from the SIP server 10, the key generation processing unit 403 of the key generation server 40 terminates the key generation processing that was being processed. Subsequently, the message processing unit 402 generates the cancel key generation response message M125, and then transmits the cancel key generation response M125 to the SIP server 10. Herein, the cancel key generation response message M125 has a body portion as shown in FIG. 8.

Next, the SIP server 10, following the process flow S503, determines whether or not a 200 OK message has been received from the service-side communications device 42. The present sequence covers the case wherein a 200 OK message has yet not been received from the service-side communications device 42 at this point, and thus the SIP message processing unit 422, following the process flow S506, transmits a SIP CANCEL message M131 to the service-side communications device 42.

Upon receiving the CANCEL message M131 from the SIP server 10, the SIP message processing unit 422 of the service-side communications device 42 generates a 200 OK message M132 as a response to the CANCEL message, and then transmits the 200 OK message M132 to the SIP server 10.

Subsequently, the SIP message processing unit 422 of in the service-side communications device 42 transmits a SIP 487 Request Terminated message (a SIP final response message) to the SIP server 10.

Upon receiving from the service-side communications device 42 the 200 OK message M132 with respect to the CANCEL message M131, the SIP server 10, following the process flows S508 and S505, terminates the process.

Figure 14:
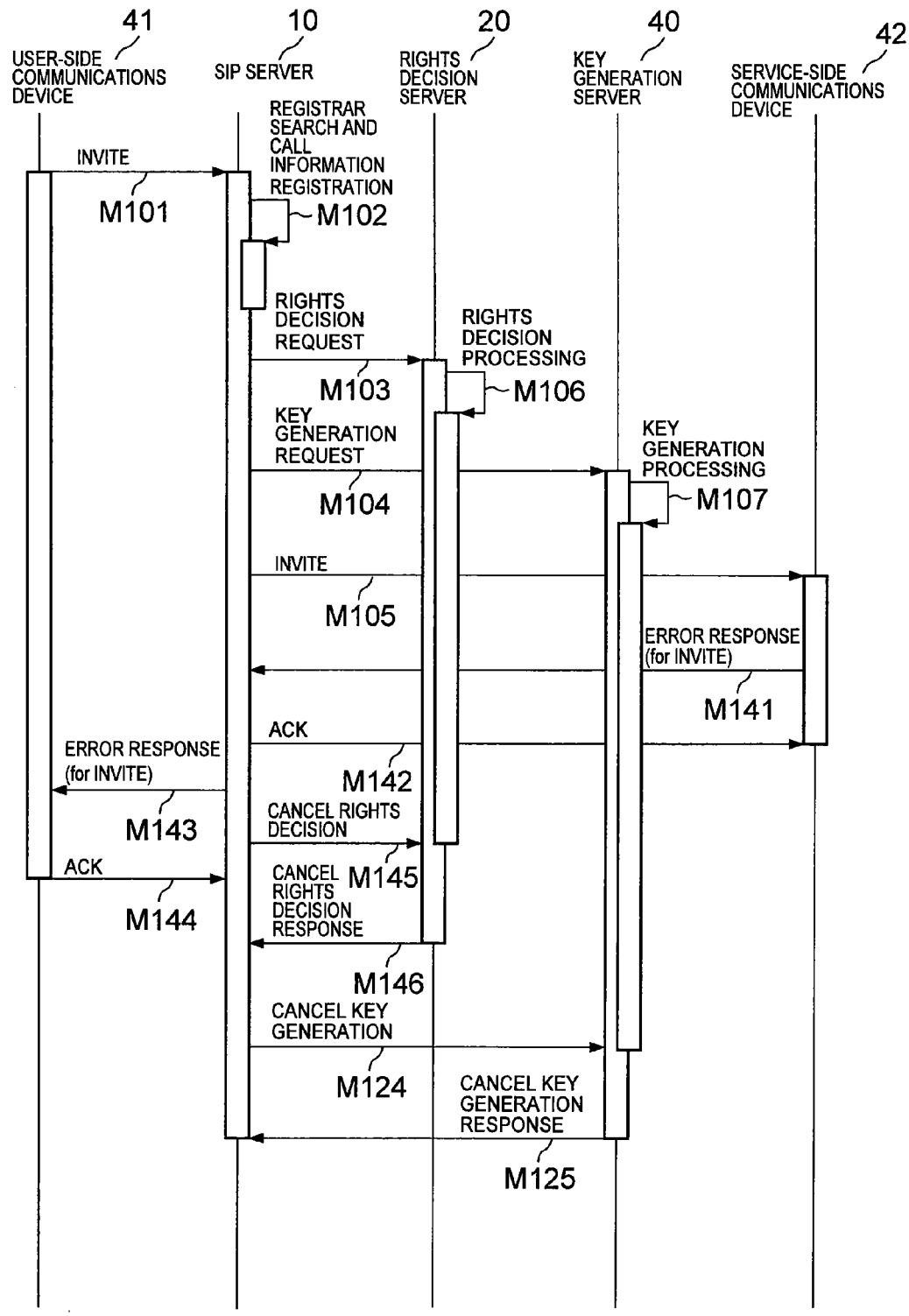
FIG. 14 is a diagram illustrating a sequence for the case wherein the service-side communications device 42 is unable to provide a service to the user-side communications device 41, in accordance with the Embodiment 1.

Next, the sequence for the case wherein the service-side communications device 42 is unable to provide a service will be described with reference to FIG. 14.

The sequence conducted from the transmission of the INVITE message M101 to the SIP server 10 by the user-side communications device 41 to the transmission of the INVITE message M105 to the service-side communications device 42 by the SIP server 10 is identical to the sequence shown in FIG. 10, and for this reason further description thereof will be omitted for the sake of brevity.

Subsequently, in order to announce that the service-side communications device 42 is unable to provide the service for some reason, the SIP message processing unit 422 transmits a SIP error response message M141 to the SIP server 10. For example, by transmitting a SIP 486 Busy Here message, the SIP message processing unit 422 is able to announce that the service-side communications device 42 has already established a large number of sessions with other user-side communications devices, and is thus unable to establish any more new sessions.

Upon receiving the SIP error response message M141, the SIP message processing unit 102 of the SIP server 10, following the process flow S401, transmits an ACK message M142 to the service-side communications device 42.

Next, the SIP message processing unit 102 of the SIP server 10, following the process flow S402, generates a SIP error response message M143 by removing the Via header containing the URI of the SIP server 10 from the header portion of the SIP error response message M141 received from the service-side communications device 42, and then transmits the generated SIP error response message M143 to the user-side communications device 41.

Upon receiving the SIP error response message M143 from the SIP server 10, the SIP message processing unit 412 of the user-side communications device 41 transmits an ACK message M144 to the SIP server 10.

Next, the SIP server 10, following the process flow S403, transmits messages to cancel the processing issued as requests to the function-providing servers. In the present sequence, the rights decision server 20 and the key generation server 40 exist as the function-providing servers during request processing.

First, the application processing unit 105 of the SIP server 10 generates the cancel rights decision message M145, and then transmits the cancel rights decision message M145 to the rights decision server 20. The cancel rights decision message M145 has a body portion as shown in FIG. 8.

Upon receiving the cancel rights decision message M142 from the SIP server 10, the rights decision processing unit 203 of the rights decision server 20 terminates the rights decision processing that was being processed. Subsequently, the message processing unit 202 generates a cancel rights decision response message M146, and then transmits the cancel rights decision response message M146 to the SIP server 10. The cancel rights decision response message M146 has a body portion as shown in FIG. 8.

An example of the body portion M146-1 of a cancel rights decision response message will now be described with reference to FIG. 8. The value "canceled", which is the value of the status attribute of the Permission element, indicates that the message was transmitted as a response to the request to abort the rights decision, while the value "358a1a77" of the id attribute matches the value of the id attribute contained in the cancel rights decision message corresponding to the present cancel rights decision response message. The content of the Permission element is identical to the content of the Permission element in the body portion M145-1 of the corresponding cancel rights decision message.

In addition, the application processing unit 105 of the SIP server 10 generates the cancel key generation message M124, and then transmits the cancel key generation message M124 to the key generation server 40. The cancel key generation message M124 has a body portion as shown in FIG. 8.

Upon receiving the key generation cancellation message M124 from the SIP server 10, the key generation processing unit 403 of the key generation server 40 terminates the key generation processing that was being processed. Subsequently, the message processing unit 402 generates the cancel key generation response message M125, and then transmits the cancel key generation response message M125 to the SIP server 10. Herein, the cancel key generation response message M125 is generated by the key generation processing unit 403, and has a body portion as shown in FIG. 8.

Upon receiving the cancel rights decision response message M146 from the rights decision server 20, as well as the cancel key generation response message M125 from the key generation server 40, the SIP server 10 terminates the process.

In the present sequence, the SIP server 10 is able to receive a SIP error response message from the service-side communications device 42 even while rights decision processing or key generation processing is being executed. Moreover, it is also possible for the SIP server 10 to forward a received SIP error response message to the user-side communications device 41 during the same period. For this reason, the present sequence is advantageous in that the user-side communications device 41 is able to more quickly ascertain that the service-side communications device 42 is unable to provide a service compared to conventional sequences.

The foregoing thus describes the sequence for the case wherein the service-side communications device 42 is unable to provide a service.

In contrast with conventional sequences, the present embodiment enables a service-side communications device 42 that has received an INVITE message to execute process start or other initial processing required for provision of a service in parallel with the rights decision processing executed by the rights decision server 20 and the key generation processing executed by the key generation server 40. For this reason, the present embodiment is advantageous in that the time required to establish a session is reduced.

Moreover, in the present embodiment, if there exists no information to be transmitted to the user-side communications device and the service-side communications device from among the information provided by the function-providing server during the establishment of a session, then the SIP server 10 need not transmit the UPDATE message M114, and the service-side communications device need not transmit the 200 OK message M115 with respect to the UPDATE message. More specifically, in the case of a system wherein key generation processing is conducted in each communications device or on the SIP server, the key generation server used in the embodiment becomes unnecessary, and there exists no information to be transmitted to the user-side communications device and the service-side communications device. As a result, it becomes possible to omit the processing to send and receive the UPDATE message and the 200 OK message, and thus the establishment of sessions at higher speeds can be realized.

In the present embodiment, the individual function-providing servers and the session management server are described as respectively different, independent devices. However, it should be appreciated that an arbitrary plurality of such servers may also be realized as a single device. If a function-providing server is included in the session management server device, then the IP address of that function-providing server becomes unnecessary. Furthermore, if a plurality of function-providing servers are incorporated into a single device, then the function-providing servers may be provided with different port numbers while sharing a common IP address.

In addition, in the present embodiment, the rights decision server 20 makes a decision regarding the rights whereby a user can receive a service provided by the service-side communications device. However, a modification of the above example is also possible, being configured such that the rights decision server 20 makes a decision regarding the rights whereby a user-side communications device can establish a session with a service-side communications device, wherein the rights decision for determining whether or not a user is permitted to receive a service provided over the session is made individually by each service-side communications device.

Embodiment 2

An Embodiment 2 of data communication in accordance with the present invention will now be described with reference to FIGS. 15 to 23.

The Embodiment 2 involves a system wherein the function-providing servers that conduct user rights decisions and session key generation are positioned as Application Servers (AS) in an IMS architecture. A process will be described for this system wherein the time required to establish a session is reduced as a result of a S-CSCF forwarding an INVITE message and transmitting processing request messages to the AS in parallel.

Figure 15:
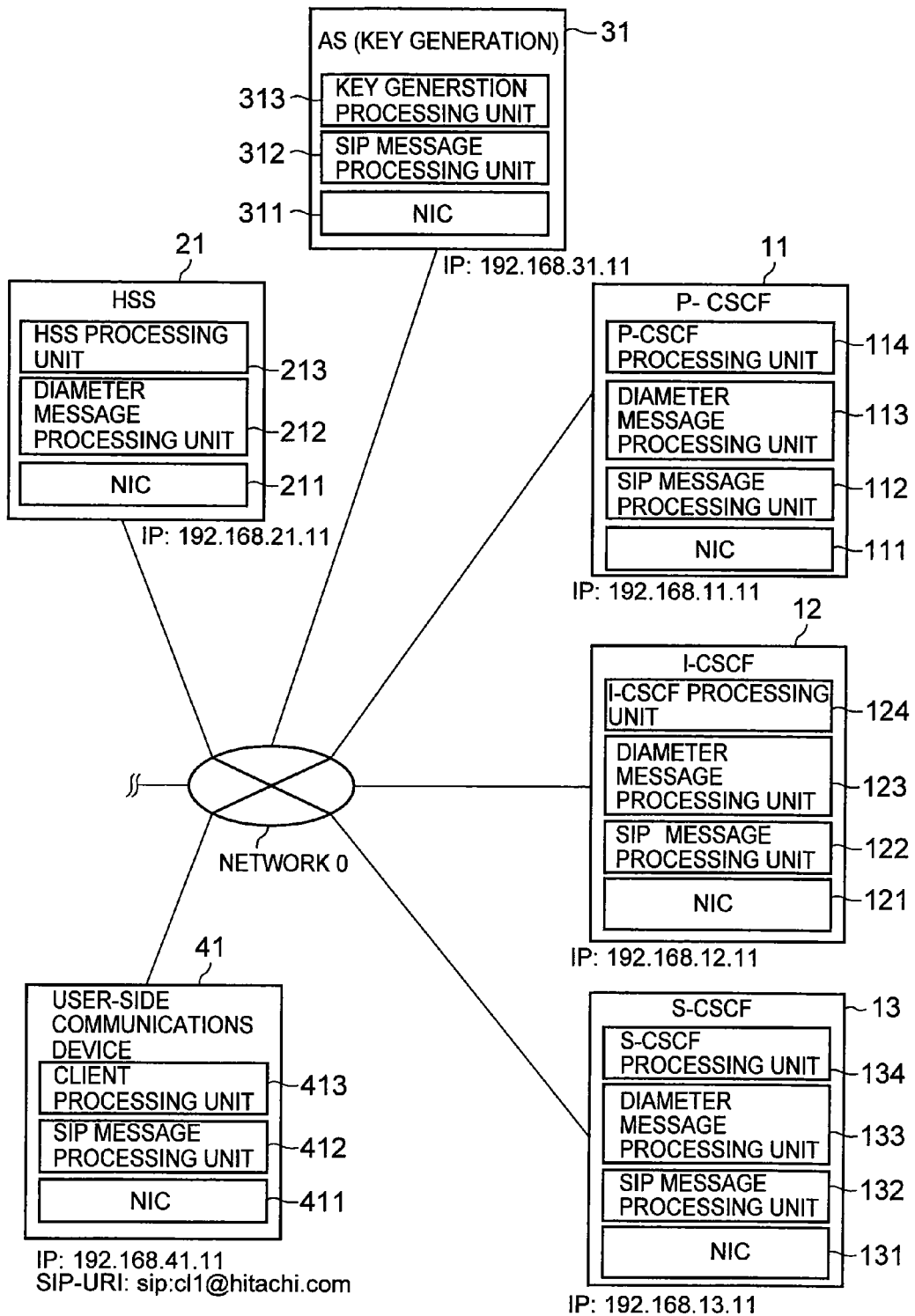
FIG. 15 is a diagram illustrating a system configuration in accordance with an Embodiment 2.
Figure 16:
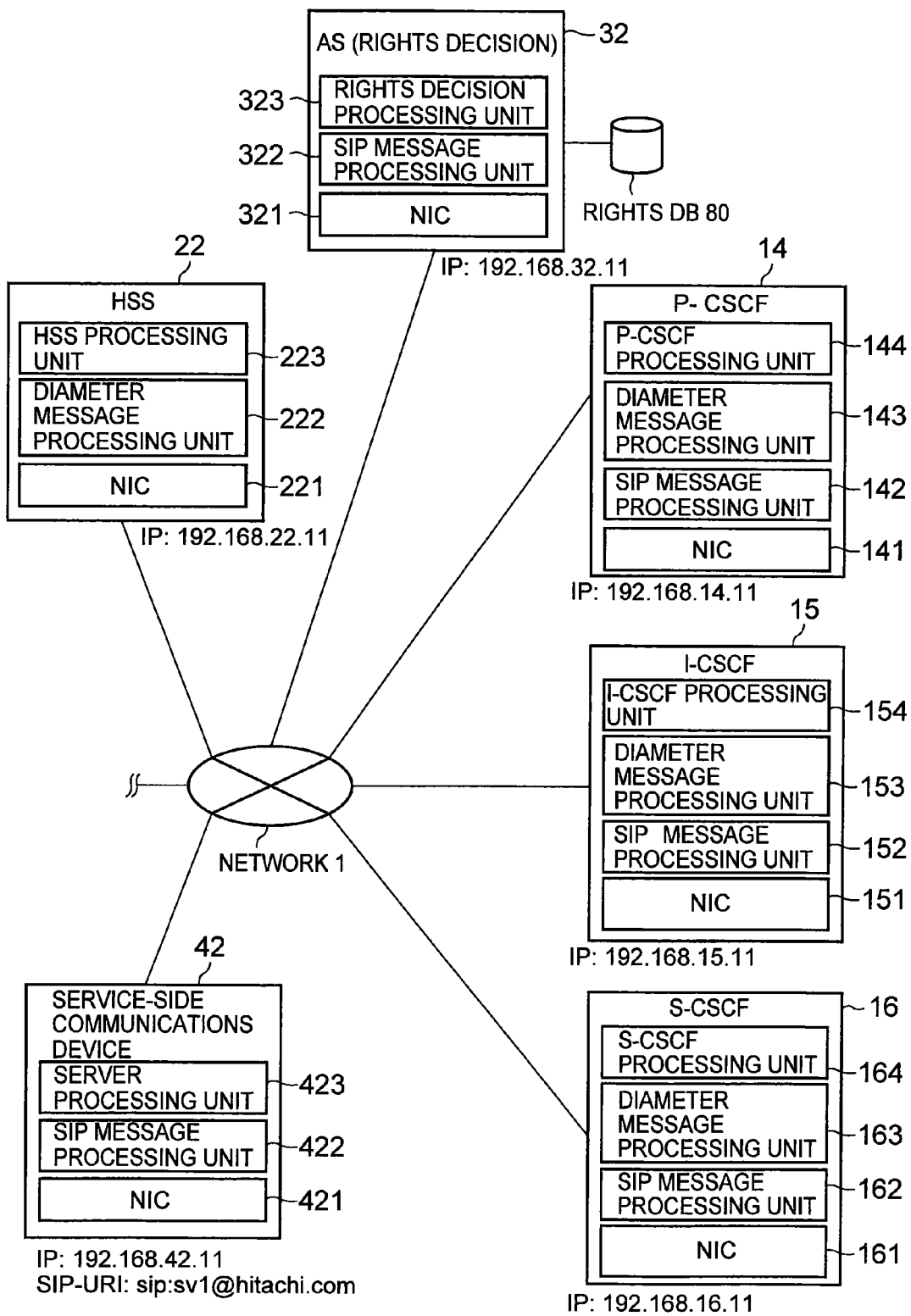
FIG. 16 is a diagram illustrating a system configuration in accordance with the Embodiment 2.

The configuration of the system in accordance with the Embodiment 2 is shown in FIGS. 15 and 16. The system is configured as operating on two networks, a network 0 and a network 1. The network 0 and the network 1 are coupled by a router or similar device, and devices present on both networks are able to mutually communicate. On the network 0, there exists a P-CSCF 11, an I-CSCF 12, an S-CSCF 13, an HSS 21, a key generation AS 31 (being an application server that conducts key generation), and a user-side communications device 41. In addition, on the network 1 there exists a P-CSCF 14, an I-CSCF 15, an S-CSCF 16, an HSS 22 for managing user information, a rights decision AS 32 (being an application server that makes rights decisions), and a service-side communications device 42.

An IP address of 192.168.11.11 is assigned to the P-CSCF 11. Functionally, the P-CSCF 11 includes, for example, a network interface card unit (NIC) 111 for communicating with other CSCFs and communications devices via the network 0, a SIP message processing unit 112 that processes SIP messages, a Diameter message processing unit 113 that processes Diameter messages, and a P-CSCF processing unit 114 that processes SIP message forwarding and other operations on the basis of requests from respective communications devices.

An IP address of 192.168.14.11 is assigned to the P-CSCF 14. The functional configuration of the P-CSCF 14 is similar to that of the P-CSCF 11, and for this reason further description thereof will be omitted for the sake of brevity.

An IP address of 192.168.12.11 is assigned to the I-CSCF 12. Functionally, the I-CSCF 12 includes, for example, a network interface card unit (NIC) 121 for communicating with other CSCFs and communications devices via the network 0, a SIP message processing unit 122 that processes SIP messages, a Diameter message processing unit 123 that processes Diameter messages, and an I-CSCF processing unit 124 that conducts S-CSCF searches and other operations on the network.

An IP address of 192.168.15.11 is assigned to the I-CSCF 15. The functional configuration of the I-CSCF 15 is similar to that of the I-CSCF 12, and for this reason further description thereof will be omitted for the sake of brevity.

An IP address of 192.168.13.11 is assigned to the S-CSCF 13. Functionally, the S-CSCF 13 includes, for example, a network interface card unit (NIC) 131 for communicating with other CSCFs and communications devices via the network 0, a SIP message processing unit 132 that processes SIP messages, a Diameter message processing unit 133 that processes Diameter messages, and a S-CSCF processing unit 134 that cooperates with an AS or other device to control sessions.

An IP address of 192.168.16.11 is assigned to the S-CSCF 16. The functional configuration of the S-CSCF 16 is similar to that of the S-CSCF 13, and for this reason further description thereof will be omitted for the sake of brevity.

An IP address of 192.168.21.11 is assigned to the HSS 21. Functionally, the HSS 21 includes, for example, a network interface card unit (NIC) 211 for communicating with other servers and communications devices via the network 0, a Diameter message processing unit 212 that processes Diameter messages, and an HSS processing unit 213 that manages user information.

An IP address of 192.168.22.11 is assigned to the HSS 22. The functional configuration of the HSS 22 is similar to that of the HSS 21, and for this reason further description will be omitted for the sake of brevity.

The HSS 21 and the HSS 22 respectively operate as Diameter servers, and the respective Diameter message processing units therein are able to receive Diameter LIR (Location-Info-Request) messages, and to transmit Diameter LIA (Location-Info-Answer) messages.

An IP address of 192.168.31.11 is assigned to the key generation AS 31. The key generation AS 31 includes, for example, a network interface card unit (NIC) 311 for communicating with other servers and communications devices via the network 0, a SIP message processing unit 312 that processes SIP messages, and a key generation processing unit 313 that executes processing to generate session keys used for encrypted communication between the user-side communications device and the service-side communications device on the basis of a processing request.

An IP address of 192.168.32.11 is assigned to the rights decision AS 32, and the rights decision AS 32 is provided with a rights DB 80 that manages rights information regarding whether or not each user is able to receive a service provided by the service-side communications device. Similarly to Embodiment 1, the subject of management by the rights DB 80 includes not only rights to receive services, but also rights to establish sessions. The rights decision AS 32 includes, for example, a network interface card unit (NIC) 321 for communicating with other servers and communications devices via the network 0, a message processing unit 322 that processes rights decision request messages, and a rights decision processing unit 323 that controls processing involving the rights DB 80.

An IP address of 192.168.41.11 is assigned to the user-side communications device 41. The functional configuration of the user-side communications device 41 is similar to that of the Embodiment 1, and for this reason further description thereof will be omitted for the sake of brevity.

An IP address of 192.168.42.11 is assigned to the service-side communications device 42. The functional configuration of the service-side communications device 42 is similar to that of the Embodiment 1, and for this reason further description thereof will be omitted for the sake of brevity.

The P-CSCFs 11 and 14, the I-CSCFs 12 and 15, and the S-CSCFs 13 and 16 respectively operate as SIP servers, and the respective SIP message processing units therein transmit and receive SIP messages such as INVITE messages, BYE messages, CANCEL messages, and UPDATE messages, as well as response messages with respect to the above.

In addition, the P-CSCFs 11 and 14, the I-CSCFs 12 and 15, and the S-CSCFs 13 and 16 respectively operate as Diameter clients, and the respective Diameter message processing units therein are able to transmit LIR messages and other Diameter protocol messages.

Hereinafter, a communications sequence will be described for the case wherein the user-side communications device 41 shown in FIG. 15 communicates data with the service-side communications device 42 shown in FIG. 16 via IMS.

First, the user-side communications device 41 and the service-side communications device 42 initiate processing to login to the respective P-CSCFs on the network 0 and the network 1. The login processing herein follows the sequence prescribed by the IMS specification described in Document 2, and for this reason further description thereof will be omitted for the sake of brevity.

Hereinafter, the sequence conducted up to the point where a user-side communications device 41 that has completed processing to login to the IMS establishes a session with the service-side communications device 42 will be described with reference to FIGS. 17 to 23.

The process flows of the S-CSCF 13 on the network 0 and the S-CSCF 16 on the network 1 are substantially equivalent to the process flow of the SIP server 10 in accordance with the Embodiment 1.

First, the sequence conducted when a user-side communications device 41 that has completed login processing requests provision of a service from the service-side communications device 42 will be described with reference to FIGS. 17 and 18.

First, the user-side communications device 41 transmits an INVITE message M401 to the P-CSCF 11 on the network 0.

Upon receiving the INVITE message M401 from the user-side communications device 41, the SIP message processing unit 112 of the P-CSCF 11 generates an INVITE message M402 on the basis of the received INVITE message M401, and then transmits the generated INVITE message M402 to the S-CSCF 13.

Upon receiving the INVITE message M402 from the P-CSCF 11, the S-CSCF 13 cross-checks filter criteria, which are acquired from the HSS 21 when the user-side communications device 41 logs in, with user information contained in the INVITE message (M403). In the present embodiment, the result of the cross-check is such that the S-CSCF 13 determines the function provided by the key generation AS 31 to be required for establishing a session, and then transmits a key generation request message M404 to the key generation AS 31. The SIP MESSAGE message is used herein as the key generation request message M404. The MESSAGE message is generated by the SIP message processing unit 132 and the S-CSCF processing unit 134. In addition, the body portion of the MESSAGE message has a structure similar to that of the body portion M104-1 of the key generation request message shown in FIG. 8.

Subsequently, the S-CSCF 13 transmits an INVITE message M405 to the I-CSCF 15 on the network 1 without waiting for a response from the key generation AS 31.

Although the S-CSCF 13 herein transmits the key generation request message M404 and the INVITE message M405 in that order, the order of these two messages is not limited to the above. Rather, the messages may be transmitted in an arbitrary order.

Upon receiving the key generation request message M404 from the S-CSCF 13, the key generation processing unit 313 of the key generation AS 31 initiates key generation processing (M406).

In parallel with the above, upon receiving the INVITE message M405 from the S-CSCF 13, the Diameter message processing unit 153 of the I-CSCF 15 on the network 1 generates a Diameter protocol LIR message M407, and then transmits the LIR message M407 to the HSS 22 on the same network 1. The LIR message M407 is transmitted in order to acquire the IP address of the S-CSCF in charge of the service-side communications device 42 specified as the destination of the INVITE message.

Upon receiving the LIR message M407 from the I-CSCF 15, the HSS 22 searches an internal DB using the IP address of the service-side communications device 42 that was extracted from the LIR message as a search key, and thereby obtains the IP address of the S-CSCF 16 in charge of the service-side communications device 42. Subsequently, the Diameter message processing unit 222 of the HSS 22 generates an LIA message M408 containing the obtained IP address of the S-CSCF 16, and then transmits the LIA message M408 to the I-CSCF 15.

When the Diameter message processing unit 153 of the I-CSCF 15 extracts the IP address of the S-CSCF 16 from the LIA message M408 received from the HSS 22, the SIP message processing unit 152 generates an INVITE message M409 based on the INVITE message M405, and then transmits the generated INVITE message M409 to the IP address of the S-CSCF 16.

Upon receiving the INVITE message M409 from the I-CSCF 15, the S-CSCF 16 cross-checks filter criteria, which are acquired from the HSS 22 when the service-side communications device 42 logs in, with service information contained in the INVITE message (M410). In the present embodiment, the result of the cross-check is such that the S-CSCF 16 determines the function of the rights decision AS 32 to be required when establishing a session, and then transmits a rights decision request message M411 to the rights decision AS 32. Similar to the key generation request message, the SIP MESSAGE message, is used as the rights decision request message M411. The MESSAGE message is generated by the SIP message processing unit 162 and the S-CSCF processing unit 164. In addition, the body portion of the MESSAGE message has a structure similar to that of the body portion M103-1 of the rights decision request message shown in FIG. 8.

Subsequently, the S-CSCF 16 transmits an INVITE message M412 to the P-CSCF 14 on the network 1 without waiting for a response from the rights decision AS 32.

Although the S-CSCF 16 herein transmits the rights decision request message M411 and the INVITE message M412 in that order, the order of these two messages is not limited to the above. Rather, the messages may be transmitted in an arbitrary order.

Upon receiving the rights decision request message M411 from the S-CSCF 16, the rights decision processing unit 323 of the rights decision AS 32 queries the rights DB 80 for rights information (M413).

In parallel with the above, upon receiving the INVITE message M412 from the S-CSCF 16, the SIP message processing unit 142 of the P-CSCF 14 on the network 1 generates an INVITE message M414 on the basis of the received INVITE message M412, and then transmits the generated INVITE message M414 to the service-side communications device 42 on the same network 1.

Upon receiving the INVITE message M414, the server processing unit 423 of the service-side communications device 42 initiates initialization processing (such as process start processing) required for provision of a service (M415). Upon completion of the initialization processing, the service-side communications device 42 transmits a 200 OK message M416 to the P-CSCF 14.

Upon receiving the 200 OK message M416 from the service-side communications device 42, the SIP message processing unit 142 of the P-CSCF 14 generates a 200 OK message M417 on the basis of the received 200 OK message M416, and then transmits the generated 200 OK message M417 to the S-CSCF 16.

Upon receiving the 200 OK message M417 from the P-CSCF 14, the SIP message processing unit 162 of the S-CSCF 16 generates an ACK message M418 with respect to the 200 OK message, and then transmits the ACK message M418 to the P-CSCF 14.

Upon receiving the ACK message M418 from the S-CSCF 16, the SIP message processing unit 142 of the P-CSCF 14 generates an ACK message M419 on the basis of the received ACK message M418, and then transmits the generated ACK message M419 to the service-side communications device 42.

When the rights decision AS 32 that was conducting rights decision processing M413 finishes the rights decision processing and outputs a result confirming that the user-side communications device 41 has rights to receive the service of the service-side communications device 42, the rights decision AS 32 transmits the rights decision result [Permit] message M420 to the S-CSCF 16. Herein, a SIP 200 OK message is used as the rights decision result [Permit] message M420. The 200 OK message is generated by the SIP message processing unit 322 and the rights decision processing unit 323. In addition, the body portion of the 200 OK message has a structure similar to that of the body portion M112-1 of the rights decision result [Permit] message shown in FIG. 8.

Upon receiving messages from both the service-side communications device 42 and the rights decision AS 32, the SIP message processing unit 162 of the S-CSCF 16 generates a 200 OK message M421 with respect to the INVITE message M409 by removing the Via header containing the URI of the S-CSCF 16 from the header portion of the 200 OK message M417 with respect to the INVITE message M412, and then transmits the generated 200 OK message M421 to the I-CSCF 15.

Upon receiving the 200 OK message M421 from the S-CSCF 16, the I-CSCF 15 generates a 200 OK message M422 on the basis of the 200 OK message, and then transmits the generated 200 OK message M422 to the S-CSCF 13 on the network 0.

Upon receiving the 200 OK message M422 from the I-CSCF 15, the SIP message processing unit 132 of the S-CSCF 13 generates an ACK message M423 with respect to the received 200 OK message, and then transmits the ACK message M423 to the S-CSCF 16.

When the key generation AS 31 that was conducting key generation processing M406 completes the key generation processing, the key generation AS 31 transmits a key generation result message M424 to the S-CSCF 13. Herein, the SIP 200 OK message is used as the key generation result message M424. The 200 OK message is generated by the SIP message processing unit 312 and the key generation processing unit 313. In addition, the body portion of the 200 OK message has a structure similar to that of the body portion M113-1 of the key generation result message shown in FIG. 8.

Upon receiving messages from both the service-side communications device 42 and the key generation AS 31, the S-CSCF 13 transmits a SIP UPDATE message M425 to the S-CSCF 16 on the network 1. The UPDATE message M425 is generated by the SIP message processing unit 132 and the S-CSCF processing unit 134. The body portion of the UPDATE message contains the session key information that was conveyed by the key generation result message M424.

Upon receiving the UPDATE message M425 from the S-CSCF 13, the SIP message processing unit 162 of the S-CSCF 16 generates an UPDATE message M426 on the basis of the received UPDATE message M425, and then transfers the generated UPDATE message M426 to the P-CSCF 14.

Upon receiving the UPDATE message M426 from the S-CSCF 16, the SIP message processing unit 142 of the P-CSCF 14 generates an UPDATE message M427 on the basis of the received UPDATE message M426, and then transfers the generated UPDATE message M427 to the service-side communications device 42.

Upon receiving the UPDATE message M427 from the P-CSCF 14, the SIP message processing unit 422 of the service-side communications device 42 acquires the session key information contained in the body portion of the UPDATE message, and subsequently generates a 200 OK message M428 with respect to the UPDATE message. Next, the 200 OK message is transmitted to the P-CSCF 14, and the service-side communications device 42 transitions to a state enabling provision of the service to the user-side communications device 41.

Upon receiving the 200 OK message M428 from the service-side communications device 42, the SIP message processing unit 142 of the P-CSCF 14 generates a 200 OK message M429 on the basis of the received 200 OK message M428, and then transmits the generated 200 OK message M429 to the S-CSCF 16.

Upon receiving the 200 OK message M429 from the P-CSCF 14, the SIP message processing unit 162 of the S-CSCF 16 generates a 200 OK message M430 on the basis of the received 200 OK message M429, and then transmits the generated 200 OK message M430 to the S-CSCF 13 on the network 0.

Upon receiving the 200 OK message M430 from the S-CSCF 16, the SIP message processing unit 132 of the S-CSCF 13 generates the header portion of a 200 OK message M431 by removing the Via header containing the URI of the S-CSCF 13 from the header portion of the INVITE message M402 that was received from the P-CSCF 11. In addition, the SIP message processing unit 132 generates the body portion 200 OK message M431 from the session key information contained in the body portion of the key generation result message received from the key generation AS 31. The SIP message processing unit 132 then generates the 200 OK message M431 by merging generated body portion with the generated header portion, and then transmits the 200 OK message M431 to the P-CSCF 11.

Upon receiving the 200 OK message M431 from the S-CSCF 13, the SIP message processing unit 112 of the P-CSCF 11 generates a 200 OK message M432 on the basis of the received 200 OK message M431, and then transmits the generated 200 OK message M432 to the user-side communications device 41.

Upon receiving the 200 OK message M432 from the P-CSCF 11, the SIP message processing unit 412 of the user-side communications device 41 acquires the session key information contained in the body portion of received the 200 OK message, and subsequently transmits an ACK message M433 to the P-CSCF 11 as a response to the received 200 OK message.

Upon receiving the ACK message M433 from the user-side communications device 41, the SIP message processing unit 112 of the P-CSCF 11 generates an ACK message M434 on the basis of the received ACK message M433, and then transmits the generated ACK message M434 to the S-CSCF 13.

The S-CSCF 13 receives the ACK message M434 from the P-CSCF 11, and then terminates the process.

According to the above sequence, a communication session is established between the user-side communications device 41 and the service-side communications device 42, and it becomes possible both for the user-side communications device 41 to access the service-side communications device 42, and for the service-side communications device 42 to provide information services to the user-side communications device 41 (M435). The communication between the user-side communications device 41 and the service-side communications device 42 is encrypted using the session key information obtained during the establishment of the session.

In the present embodiment, the key generation processing M406 conducted by the key generation AS 31, the rights decision processing M413 conducted by the rights decision AS 32, and the process start or other processing M415 conducted by the service-side communications device 42 are executed in parallel. For this reason, the foregoing sequence is advantageous in that the time required until the initiation of communications is reduced compared to that of a sequence wherein the respective processes are executed sequentially.

The sequence for the case wherein the user-side communications device 41 issues a request to the service-side communications device 42 to terminate the session follows the procedure prescribed by the IMS specification, and for this further description thereof will be omitted for the sake of brevity.

Figure 19:
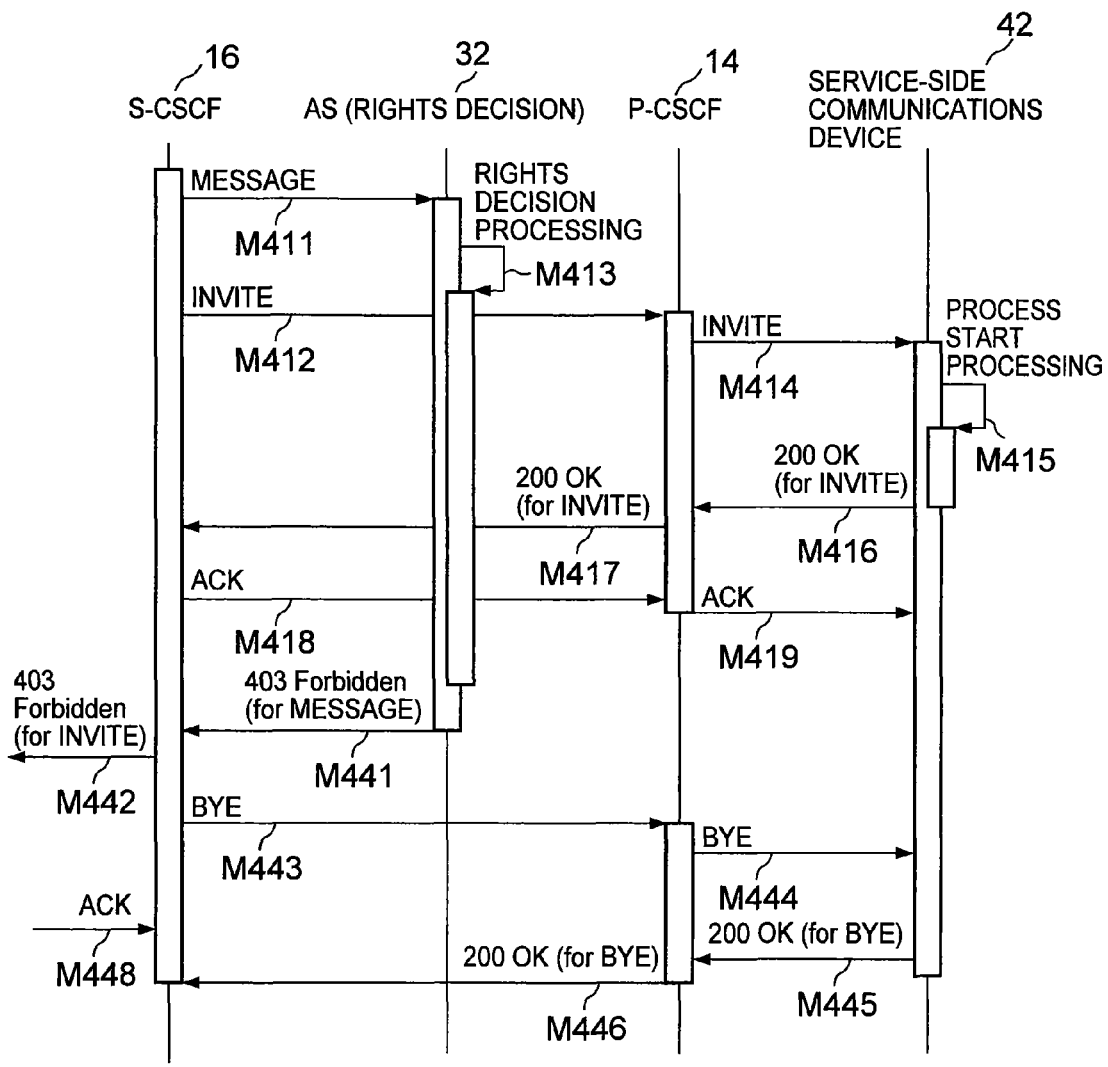
FIG. 19 is a diagram illustrating a sequence for the case wherein the service-side communications device 42 denies the provision of a service to the user-side communications device 41, in accordance with the Embodiment 2.

Next, the sequence for the case wherein the user-side communications device 41 does not have rights to receive the service of the service-side communications device 42, and furthermore wherein the 200 OK message is issued from the service-side communications device 42 prior to the rights decision result, will be described with reference to FIGS. 19 and 20.

Figure 17:
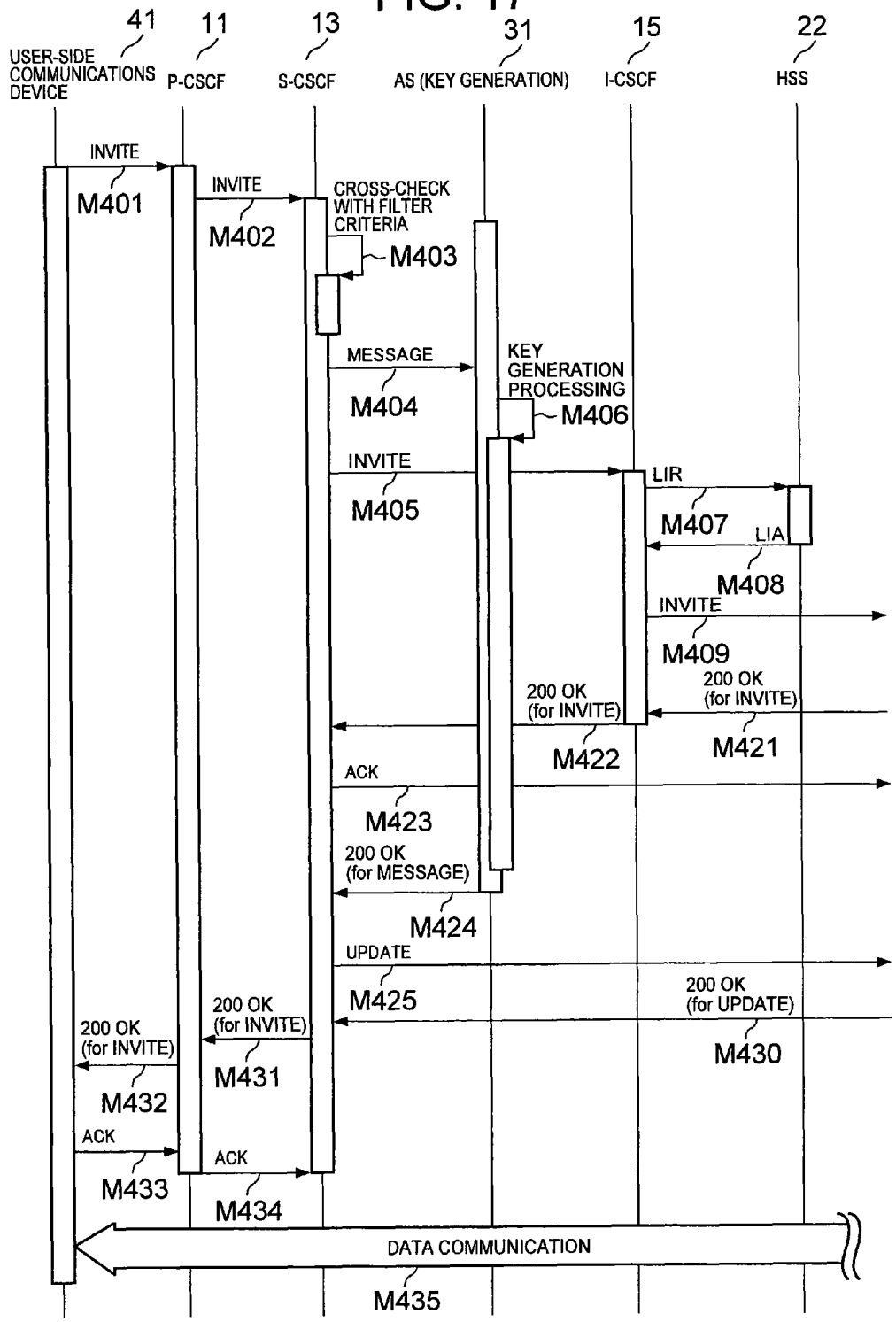
FIG. 17 is a diagram illustrating a sequence for the case wherein the service-side communications device 42 provides a service to the user-side communications device 41, in accordance with the Embodiment 2.
Figure 18:
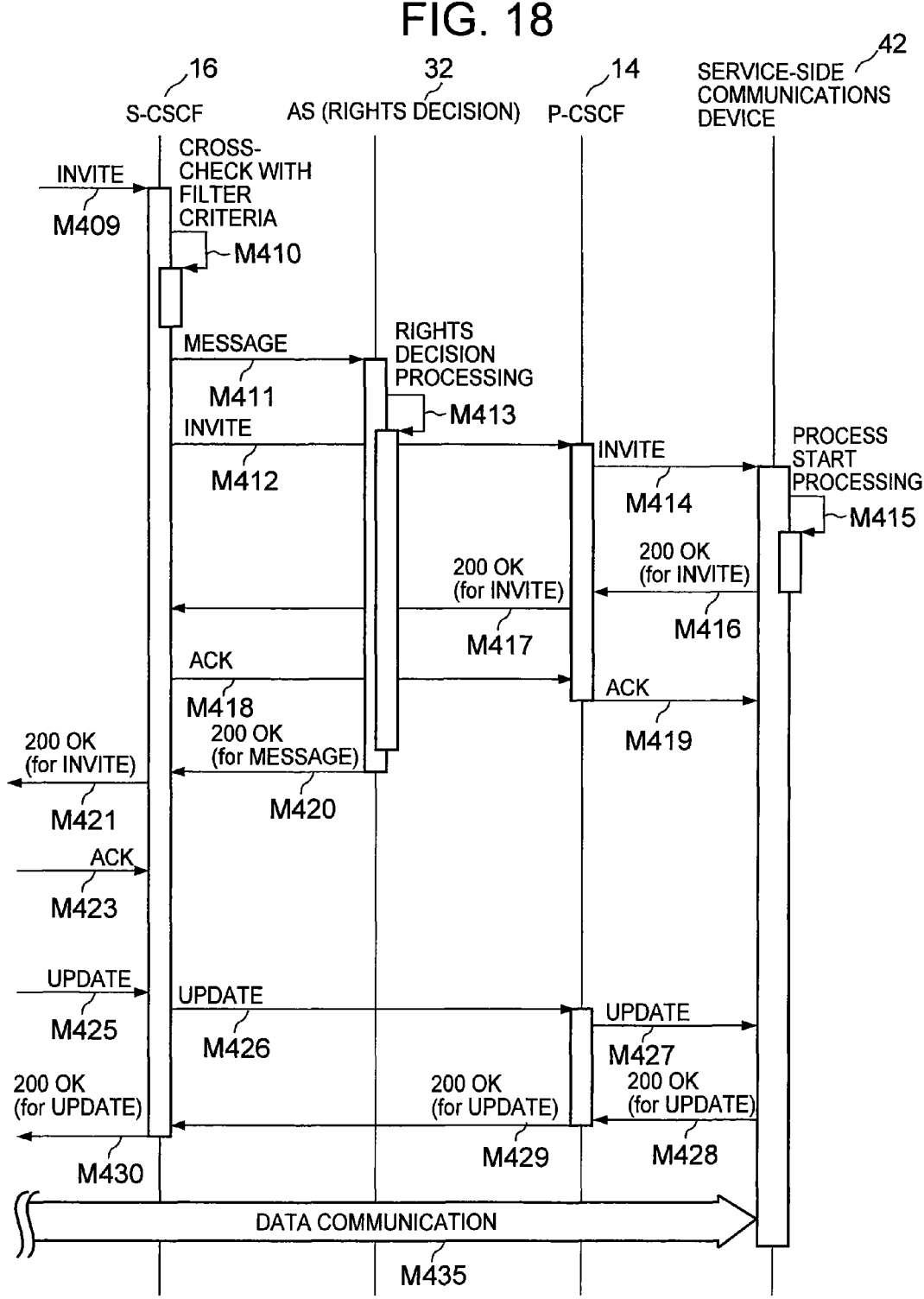
FIG. 18 is a diagram illustrating a sequence for the case wherein the service-side communications device 42 provides a service to the user-side communications device 41, in accordance with the Embodiment 2.

The sequence conducted from the transmission of the INVITE message M401 to the P-CSCF 11 by the user-side communications device 41 to the transmission of the ACK message M419 to the service-side communications device 42 by the P-CSCF 14 is similar to the sequence shown in FIGS. 17 and 18.

Subsequent to the above, if the rights decision AS 32 outputs a rights decision processing result confirming that the user-side communications device 41 does not have rights to receive the service of the service-side communications device 42, then the rights decision AS 32 transmits the rights decision result [Deny] message M441 to the S-CSCF 16. Herein, the SIP 403 Forbidden message is used as the rights decision result [Deny] message M441. The 403 Forbidden message is generated by the SIP message processing unit 322 and the rights decision processing unit 323. In addition, the body portion of the 403 Forbidden message has a structure similar to that of the body portion M121-1 of the rights decision [Deny] message shown in FIG. 6.

Upon receiving the rights decision result [Deny] message M441, the SIP message processing unit 162 of the S-CSCF 16 generates a 403 Forbidden message M442 with respect to the INVITE message M409, and then transmits the 403 Forbidden message M442 to the I-CSCF 15.

In addition, the SIP message processing unit 162 of the S-CSCF 16 generates a BYE message M443, and then transmits the BYE message M443 to the P-CSCF 14.

Upon receiving the BYE message M443 from the S-CSCF 16, the SIP message processing unit 142 of the P-CSCF 14 generates a BYE message M444 on the basis of the received BYE message M443, and then transmits the generated BYE message M444 to the service-side communications device 42.

Upon receiving the BYE message M444 from the P-CSCF 14, the SIP message processing unit 422 of the service-side communications device 42 generates a 200 OK message M445 as a response to the received BYE message, and then transmits the 200 OK message M445 to the P-CSCF 14.

Upon receiving the 200 OK message M445 from the service-side communications device 42, the SIP message processing unit 142 of the P-CSCF 14 generates a 200 OK message M446 based on the received 200 OK message M445, and then transmits the generated 200 OK message M446 to the S-CSCF 16.

Figure 20:
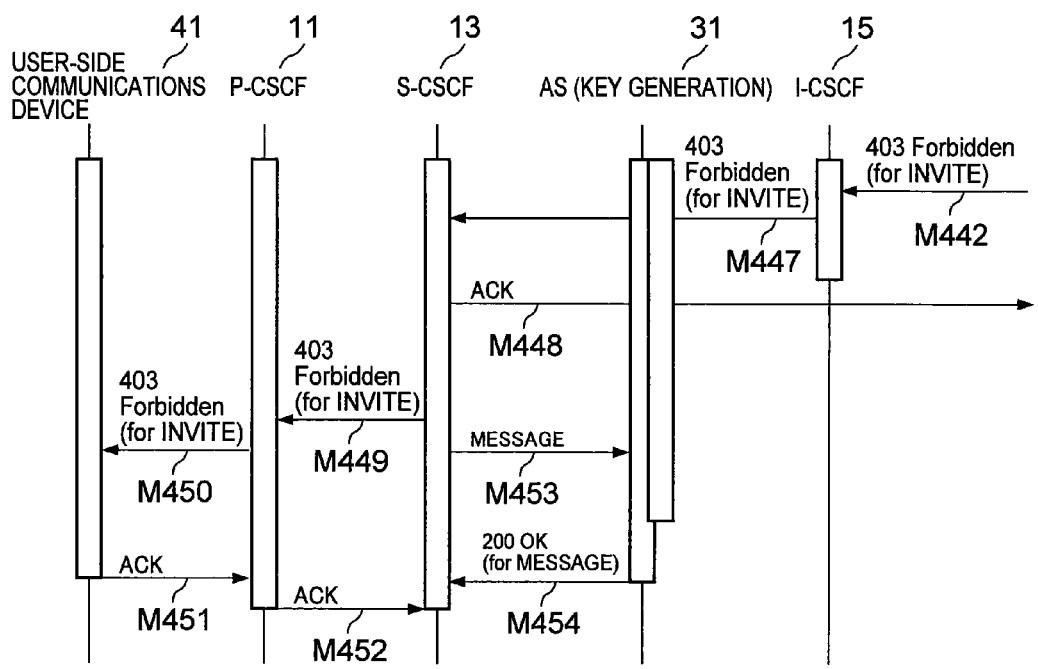
FIG. 20 is a diagram illustrating a sequence for the case wherein the service-side communications device 42 denies the provision of a service to the user-side communications device 41, in accordance with the Embodiment 2.

In FIG. 20, upon receiving the 403 Forbidden message M442 from the S-CSCF 16, the SIP message processing unit 152 of the I-CSCF 15 generates a 403 Forbidden message M447 on the basis of the received 403 Forbidden message M442, and then transmits the generated 403 Forbidden message M447 to the S-CSCF 13 on the network 0.

Upon receiving the 403 Forbidden message M447 from the I-CSCF 15, the SIP message processing unit 132 of the S-CSCF 13 generates an ACK message M448 as a response to the received 403 Forbidden message M447, and then transmits the ACK message M448 to the S-CSCF 16 on the network 1.

In addition, the SIP message processing unit 132 of the S-CSCF 13 generates a 403 Forbidden message M449 on the basis of the 403 Forbidden message M447 received from the I-CSCF 15, and then transmits the generated 403 Forbidden message M449 to the P-CSCF 11.

Upon receiving the 403 Forbidden message M449 from the S-CSCF 13, the SIP message processing unit 112 of the P-CSCF 11 generates a 403 Forbidden message M450 on the basis of the received 403 Forbidden message M449, and then transmits the generated 403 Forbidden message M450 to the user-side communications device 41.

Upon receiving the 403 Forbidden message M450 from the P-CSCF 11, the SIP message processing unit 412 of the user-side communications device 41 generates an ACK message M451 as a response to the 403 Forbidden message M450, and then transmits the ACK message M451 to the P-CSCF 11.

Upon receiving the ACK message M451 from the user-side communications device 41, the SIP message processing unit 112 of the P-CSCF 11 generates an ACK message M452 on the basis of the received ACK message M451, and then transmits the generated ACK message M452 to the S-CSCF 13.

In addition, the S-CSCF 13 transmits a cancel key generation message M453 to the key generation AS 31. Herein, the SIP MESSAGE message is used as the cancel key generation message M453. The MESSAGE message is generated by the SIP message processing unit 132. In addition, the body portion of the MESSAGE message has a structure similar to that of the body portion M124-1 of the cancel key generation message shown in FIG. 8.

Upon receiving the cancel key generation message M453 from the S-CSCF 13, the key generation processing unit 313 of the key generation AS 31 terminates the key generation processing that was being processed. Subsequently, the SIP message processing unit 132 generates a cancel key generation response message M454, and then transmits the cancel key generation response message M454 to the S-CSCF 13. Herein, the SIP 200 OK message is used as the cancel key generation response message M454. In addition, the body portion of the 200 OK message has a structure similar to the body portion M125-1 of the cancel key generation response message shown in FIG. 8.

Figure 21:
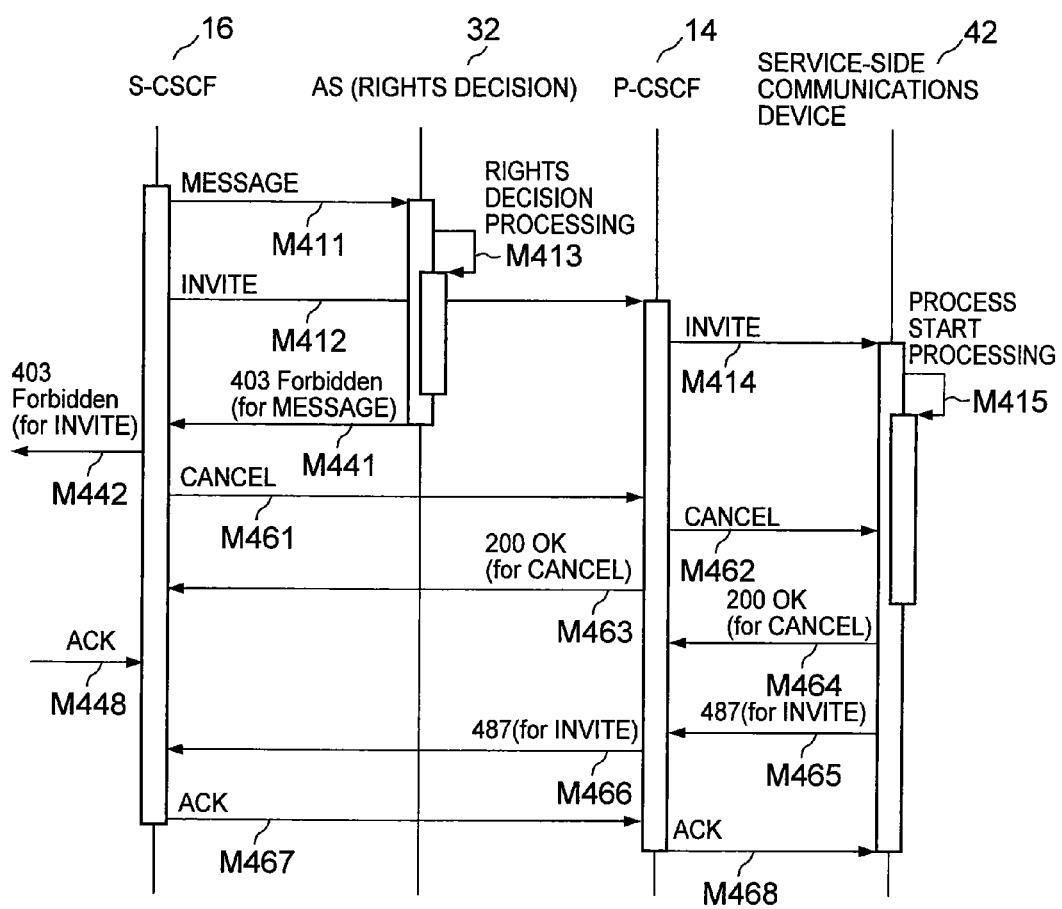
FIG. 21 is a diagram illustrating a sequence for the case wherein the service-side communications device 42 denies the provision of a service to the user-side communications device 41, in accordance with the Embodiment 2.

Next, the sequence for the case wherein the user-side communications device 41 does not have rights to receive the service of the service-side communications device 42, and furthermore wherein the rights decision result is issued prior to the 200 OK message from the service-side communications device 42, will be described with reference to FIG. 21.

The sequence conducted from the transmission of the INVITE message M401 to the P-CSCF 11 by the user-side communications device 41 transmits to the initiation of execution of the process start or other processing M415 by the service-side communications device 42 is similar to the sequence shown in FIGS. 17 and 18.

Subsequent to the above, if the rights decision AS 32 outputs a rights decision processing result confirming that the user-side communications device 41 does not have rights to receive the service of the service-side communications device 42, then the rights decision AS 32 transmits the rights decision result [Deny] message M441 to the S-CSCF 16. In the present sequence, the rights decision result [Deny] message M441 is transmitted before the service-side communications device 42 transmits a 200 OK message. The rights decision result [Deny] message M441 herein is identical to the rights decision result [Deny] message M441 in the sequence shown in FIG. 19.

Upon receiving the rights decision result [Deny] message M441 from the rights decision AS 32, the SIP message processing unit 162 of the S-CSCF 16 generates a 403 Forbidden message M442 with respect to the INVITE message M409, and then transmits the 403 Forbidden message M442 to the I-CSCF 15.

In addition, the SIP message processing unit 162 of the S-CSCF 16 generates a CANCEL message M461, and then transmits the CANCEL message M461 to the P-CSCF 14.

The subsequent sequence conducted by the I-CSCF 15, having received the 403 Forbidden message M442, and each device in the network 0, is identical to the sequence shown in FIG. 20, and for this reason further description thereof will be omitted for the sake of brevity.

Upon receiving the CANCEL message M461 from the S-CSCF 16, the SIP message processing unit 142 of the P-CSCF 14 generates a CANCEL message M462 on the basis of the received CANCEL message M461, and then transmits the generated CANCEL message M462 to the service-side communications device 42.

In addition, the SIP message processing unit 142 of the P-CSCF 14 generates a 200 OK message M463 as a response message with respect to the CANCEL message M461, and then transmits the 200 OK message M463 to the S-CSCF 16.

Upon receiving the CANCEL message M462 from the P-CSCF 14, the SIP message processing unit 422 of the service-side communications device 42 generates a 200 OK message M464 as a response to the received CANCEL message, and then transmits the 200 OK message M464 to the P-CSCF 14.

Subsequently, the SIP message processing unit 422 of the service-side communications device 42 generates a 487 Request Terminated message (a SIP final response message), and transmits the 487 Request Terminated message to the P-CSCF 14.

Upon receiving the 487 Request Terminated message from the service-side communications device 42, the SIP message processing unit 142 of the P-CSCF 14 generates a 487 Request Terminated message M466 on the basis of the received 487 Request Terminated message, and then transmits the generated 487 Request Terminated message M466 to the S-CSCF 16.

Upon receiving the 487 Request Terminated message M466 from the P-CSCF 14, the SIP message processing unit 162 of the S-CSCF 16 generates an ACK message M467 as a response to the received 487 Request Terminated message, and then transmits the ACK message M467 to the P-CSCF 14.

Upon receiving the ACK message M467 from the S-CSCF 16, the SIP message processing unit 142 of the P-CSCF 14 generates an ACK message M468 on the basis of the received ACK message M467, and then transmits the generated ACK message M468 to the service-side communications device 42.

Figure 22:
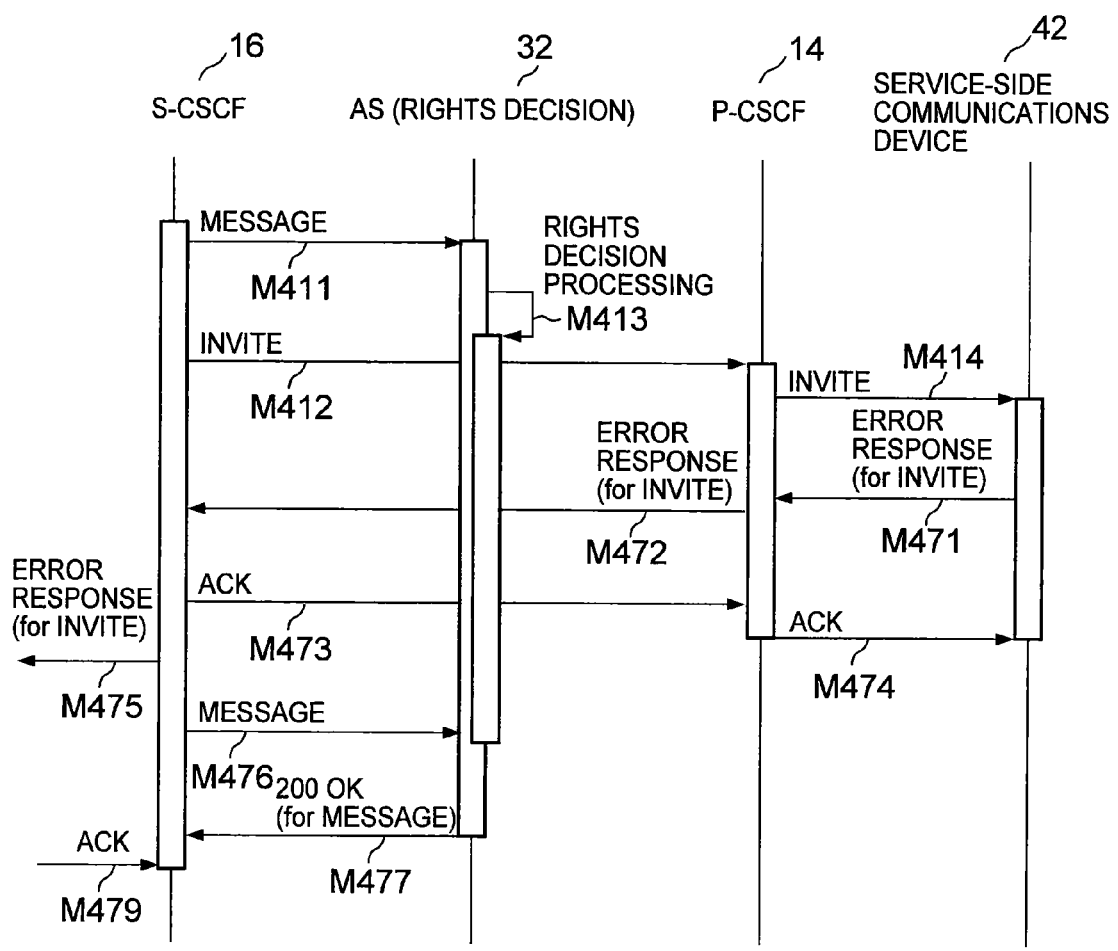
FIG. 22 is a diagram illustrating a sequence for the case wherein the service-side communications device 42 is unable to provide a service to the user-side communications device 41, in accordance with the Embodiment 2.
Figure 23:
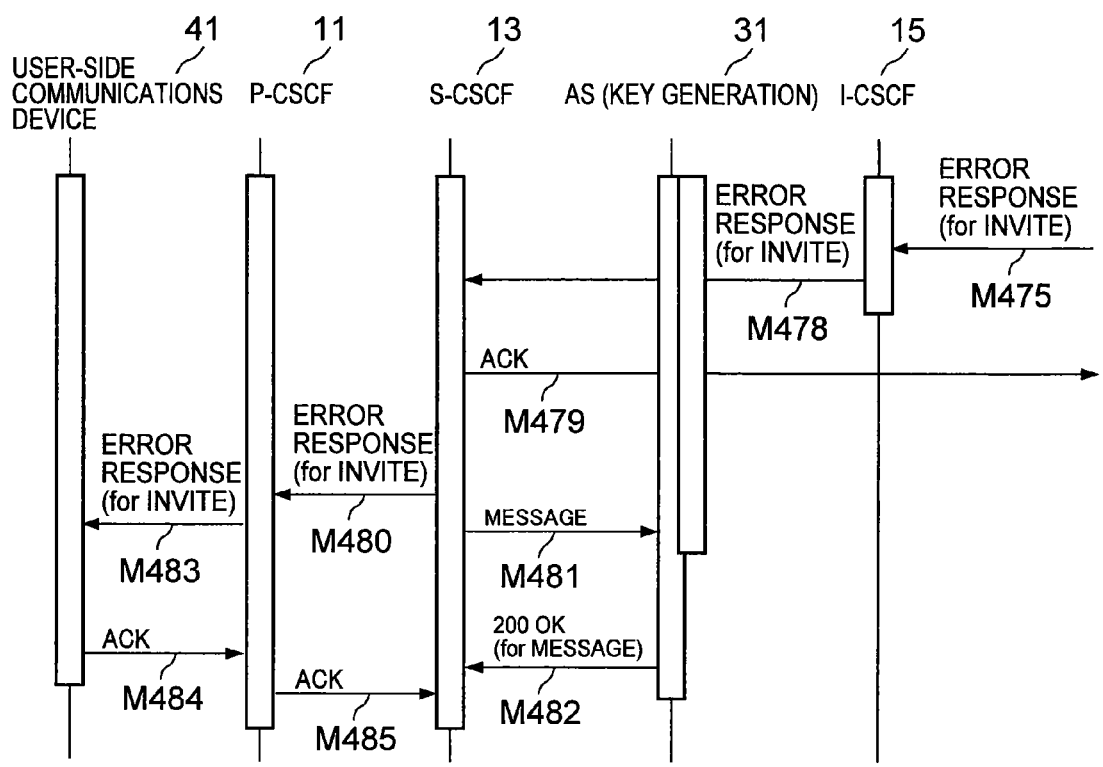
FIG. 23 is a diagram illustrating a sequence for the case wherein the service-side communications device 42 is unable to provide a service to the user-side communications device 41, in accordance with the Embodiment 2.

Next, the sequence for the case wherein the service-side communications device 42 is unable to provide a service will be described with reference to FIGS. 22 and 23.

The sequence conducted from the transmission of the INVITE message M401 to the P-CSCF 11 by the user-side communications device 41 to the transmission of the INVITE message M414 to the service-side communications device 42 by the P-CSCF 14 is similar to the sequence shown in FIGS. 17 and 18.

Subsequently, in order to announce that the service-side communications device 42 is unable to provide the service for some reason, the service-side communications device 42 transmits a SIP error response message M471 to the P-CSCF 14. For example, by transmitting the SIP 486 Busy Here message, the service-side communications device 42 is able to announce that the service-side communications device 42 has already established a large number of sessions with other user-side communications devices, and is thus unable to establish any more new sessions.

Upon receiving the SIP error response message M471 from the service-side communications device 42, the SIP message processing unit 142 of the P-CSCF 14 generates a SIP error response message M472 on the basis of the received SIP error response message M471, and then transmits the generated SIP error response message M472 to the S-CSCF 16.

Upon receiving the SIP error response message M472 from the P-CSCF 14, the SIP message processing unit 162 of the S-CSCF 16 generates an ACK message M473 as a response to the received SIP error response message, and then transmits the ACK message M473 to the P-CSCF 14.

Upon receiving the ACK message M473 from the S-CSCF 16, the SIP message processing unit 142 of the P-CSCF 14 generates an ACK message M474 on the basis of the received ACK message M473, and then transmits the generated ACK message M474 to the service-side communications device 42.

Next, the SIP message processing unit 162 of the S-CSCF 16 generates a SIP error response message M475 on the basis of the received SIP error response message M472, and then transmits the generated SIP error response message M475 to the I-CSCF 15.

Next, the S-CSCF 16 transmits a cancel rights decision message M476 to the rights decision AS 32. Herein, the SIP MESSAGE message is used as the rights decision cancellation message M476. The MESSAGE message is generated by the SIP message processing unit 162. In addition, the body portion of the MESSAGE message has a structure similar to the body portion M145-1 of the cancel rights decision message shown in FIG. 8.

Upon receiving the cancel rights decision message M476 from the S-CSCF 16, the rights decision processing unit 323 of the rights decision AS 32 terminates the rights decision processing that was being processed. Subsequently, the SIP message processing unit 322 generates a cancel rights decision response message M477, and then transmits the cancel rights decision message M477 to the S-CSCF 16. Herein, the SIP 200 OK message is used as the rights decision cancellation response message M477. In addition, the body portion of the 200 OK message has a structure similar to the body portion M146-1 of the cancel rights decision response message shown in FIG. 8.

Meanwhile, the I-CSCF 15 generates a SIP error response message M478 on the basis of the SIP error response message M475 received from the S-CSCF 16, and then transmits the generated SIP error response message M478 to the S-CSCF 13 on the network 0.

Upon receiving the SIP error response message M478 from the I-CSCF 15 on the network 1, the SIP message processing unit 132 of the S-CSCF 13 generates an ACK message M479 as a response to the received SIP error response message, and then transmits the ACK message M479 to the S-CSCF 16 on the network 1.

Next, the SIP message processing unit 132 of the S-CSCF 13 generates a SIP error response message M480 on the basis of the SIP error response message M478, and then transmits the generated SIP error response message M480 to the P-CSCF 11.

Next, the S-CSCF 13 transmits a cancel key generation message M481 to the key generation AS 31. Herein, the SIP MESSAGE message is used as the cancel key generation message M481. The MESSAGE message is generated by the SIP message processing unit 132. In addition, the body portion of the MESSAGE message has a structure similar to the body portion M124-1 of the cancel key generation message shown in FIG. 8.

Upon receiving the cancel key generation message M481 from the S-CSCF 13, the key generation processing unit 313 of the key generation AS 31 terminates the key generation processing that was being processed. Subsequently, the SIP message processing unit 312 generates a cancel key generation response message M482, and then transmits the cancel key generation response M482 to the S-CSCF 13. Herein, the SIP 200 OK message is used as the cancel key generation response message M482. In addition, the body portion of the 200 OK message has a structure similar to the body portion M125-1 of the cancel key generation response message shown in FIG. 8.

Meanwhile, upon receiving the SIP error response message M480 from the S-CSCF 13, the SIP message processing unit 112 of the P-CSCF 11 generates a SIP error response message M483 on the basis of the received SIP error response message M480, and then transmits the generated SIP error response message M483 to the user-side communications device 41.

Upon receiving the SIP error response message M483 from the P-CSCF 11, the SIP message processing unit 412 of the user-side communications device 41 generates an ACK message M484 as a response to the received SIP error response message, and then transmits the ACK message M484 to the P-CSCF 11.

Upon receiving the ACK message M484 from the user-side communications device 41, the SIP message processing unit 112 of the P-CSCF 11 generates an ACK message M485 on the basis of the received ACK message M484, and then transmits the generated ACK message M485 to the S-CSCF 13.

In the present embodiment, the S-CSCF 16 and the S-CSCF 13 are able to receive a SIP error response message from the service-side communications device 42 that has been forwarded by the P-CSCF or I-CSCF, even while rights decision processing or key generation processing is being executed. The SIP error response message is then delivered to the user-side communications device 41 via the P-CSCF 11. For this reason, the present embodiment is advantageous in that the user-side communications device 41 is able to more quickly ascertain that the service-side communications device 42 is unable to provide a service compared to conventional sequences.

In addition, in the present embodiment, the rights decision AS 32 makes a decision regarding the rights whereby a user can receive a service provided by the service-side communications device. However, a modification of the above example is also possible, being configured such that the rights decision AS 32 makes a decision regarding the rights whereby a user-side communications device can establish a session with a service-side communications device, wherein the rights decision for determining whether or not a user is permitted to receive a service provided over the session is made individually by each service-side communications device.

The specification and drawings are, accordingly, to be regarded in an illustrative rather than a restrictive sense. It will, however, be evident that various modifications and changes may be made thereto without departing from the spirit and scope of the invention as set forth in the claims.

What is claimed is:

1. A data communication system, comprising:
   a first communications device;
   a second communications device;
   a session management server that manages a session whereby the first and second communications devices conduct data communication; and
   one or more function-providing servers that provide functions required for establishing the session,
   wherein:
   when a request message requesting the establishment of a session with the second communications device is received from the first communications device, the session management server executes, in parallel:
   (a) a process of forwarding the request message to the second communications device and then waiting for a response, and
   (b) a process of issuing a request that the one or more function-providing servers execute a process required for establishing the session and then waiting for a response,
   the session management server selects subsequent processes depending on the contents of responses or difference in the timing for receiving the responses, and
   if a message denying provision of a service from the second communications device to the first communications device is received from the one or more function-providing servers before a response message with respect to the request message is received from the second communications device, then the session management server transmits a cancel message canceling the session establishment request that was transmitted to the second communications device, and a cancel message canceling the request, whose result has not yet been received, that the one or more function-providing servers execute the process required for establishing the session to the one or more function-providing servers.

2. A data communication system, comprising:
   a first communication device;
   a second communications device;
   a session management server that manages a session whereby the first and second communications devices conduct data communication; and
   one or more function-providing servers that provide functions required for establishing the session,
   wherein:
   when a request message requesting the establishment of a session with the second communications device is received from the first communications device, the session management server executes, in parallel:
   (a) a process of forwarding the request message to the second communications device and then waiting for a response, and
   (b) a process of issuing a request that the one or more function-providing servers execute a process required for establishing the session and then waiting for a response,
   the session management server selects subsequent processes depending on the contents of responses or difference in the timing for receiving the responses,
   if a message indicating that a service can be provided is received from the second communications device in response to the forwarded request message, then the session management server transmits, to the second communications device, a response message with respect to the message indicating that a service can be provided, and
   after transmitting the response message, the session management server waits for a result of the request, whose result has not yet been received, issued to the one or more function-providing servers.

3. The data communication system according to claim 2, wherein
   if a message denying provision of a service from the second communications device to the first communications device is received from the one or more function-providing servers as a result of the requested process, then the session management server transmits a cancel message canceling the session establishment request that was forwarded as the request message to the second communications device, and cancel messages canceling requests to one or more other function-providing servers.

4. The data communication system according to claim 3, wherein
   the cancel message canceling the session establishment request transmitted by the session management server to the second communications device contains information for indicating that the processing of establishing a session was aborted.

5. A data communication system, comprising:
   a first communication device;
   a second communications device;
   a session management server that manages a session whereby the first and second communications devices conduct data communication; and
   one or more function-providing servers that provide functions required for establishing the session,
   wherein:
   when a request message requesting the establishment of a session with the second communications device is received from the first communications device, the session management server executes, in parallel:
   (a) a process of forwarding the request message to the second communications device and then waiting for a response, and
   (b) a process of issuing a request that the one or more function-providing servers execute a process required for establishing the session and then waiting for a response,
   the session management server selects subsequent processes depending on the contents of responses or difference in the timing for receiving the responses,
   if a message permitting provision of a service from the second communications device to the first communications device is received from the one or more function-providing servers as a result of the requested process, then the session management server transmits, to the one or more function-providing servers, a response message with respect to the message permitting the provision of a service, and after transmitting the response message, the session management server waits for a result of another request that the one or more function-providing servers execute a process required for establishing the session, and a result with respect to the request message that was transmitted to the second communications device.

6. The data communication system according to claim 5, wherein if responses are received from the second communications device and the one or more function-providing servers requested to execute processes, then the session management server transmits information contained in the messages received from the one or more function-providing servers, to the second communications device and the first communications device designated as transmission destinations.

7. The data communication system according to claim 5, wherein if responses are received from the second communications device and the one or more function-providing servers requested to execute processes, then the session management server transmits, to the first communications device, a response message with respect to the request message requesting the establishment of a session.

* * * * *